US010235140B2

(12) United States Patent
Avadhanula et al.

(10) Patent No.: US 10,235,140 B2
(45) Date of Patent: *Mar. 19, 2019

(54) DEFINING ATTRIBUTES OF VARIABLES IN A STATE CHART OF A TECHNICAL COMPUTING ENVIRONMENT

(71) Applicant: The MathWorks, Inc., Natick, MA (US)

(72) Inventors: Srinath Avadhanula, Sudbury, MA (US); Pieter J. Mosterman, Framingham, MA (US); Ebrahim Mestchian, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/285,991

(22) Filed: May 23, 2014

(65) Prior Publication Data

US 2014/0359560 A1 Dec. 4, 2014

Related U.S. Application Data

(60) Provisional application No. 61/827,863, filed on May 28, 2013.

(51) Int. Cl.
*G06F 8/10* (2018.01)
*G06F 8/34* (2018.01)
(Continued)

(52) U.S. Cl.
CPC .............. *G06F 8/35* (2013.01); *G06F 8/10* (2013.01); *G06F 8/34* (2013.01); *G06F 8/51* (2013.01); *G06F 9/4484* (2018.02); *G06F 9/4498* (2018.02)

(58) Field of Classification Search
CPC ...... G06F 8/434; G06F 8/437; G06F 17/5009; G06F 8/30; G06F 8/33; G06F 8/34; G06F 8/40; G06F 8/51; G06F 2217/74
See application file for complete search history.

(56) References Cited

U.S. PATENT DOCUMENTS 5,313,574 A * 5/1994 Beethe .................. G06F 9/4843
715/763
5,497,500 A * 3/1996 Rogers .................. G06F 3/0481
714/E11.217
(Continued)

FOREIGN PATENT DOCUMENTS

WO WO 2007/027622 3/2007

OTHER PUBLICATIONS

Notification of Transmittal of the International Search Report and the Written Opinion of the International Searching Authority, or the Declaration corresponding to PCT/US2014/039574, dated Nov. 10, 2014, 10 pages.

(Continued)

*Primary Examiner* — Hiren P Patel
*Assistant Examiner* — Erika Kretzmer
(74) *Attorney, Agent, or Firm* — Harrity & Harrity, LLP

(57) ABSTRACT

A device may receive a model generated via a technical computing environment, where the model included a state chart with one or more variables. The device may receive a selection of a particular variable from the state chart, and may provide, for display and based on the selection, a user interface for defining attributes associated with the particular variable. The device may receive, via the user interface, one or more user-defined attributes for the particular variable, where at least one of the one or more user-defined attributes is defined independently of a reference to the particular (Continued)

variable. The device may apply the one or more user-defined attributes in the model and the state chart.

20 Claims, 16 Drawing Sheets

(51) Int. Cl.
    *G06F 8/35*     (2018.01)
    *G06F 8/51*     (2018.01)
    *G06F 9/448*     (2018.01)

(56) References Cited

U.S. PATENT DOCUMENTS

| | | | | |
|---|---|---|---|---|
| 5,821,934 A * | 10/1998 | Kodosky | ............ | G06F 11/3636 715/763 |
| 6,282,699 B1 | 8/2001 | Zhang et al. | | |
| 7,020,850 B2 * | 3/2006 | Raghavan | ................ | G06F 8/34 703/23 |
| 7,200,843 B2 * | 4/2007 | Shann | ....................... | G06F 8/54 717/162 |
| 7,487,076 B2 * | 2/2009 | Szpak | ................ | G06F 17/5009 703/14 |
| 7,801,715 B2 * | 9/2010 | Ciolfi | .................. | G06F 17/5009 703/13 |
| 7,809,545 B2 * | 10/2010 | Ciolfi | ........................ | G06F 8/34 703/22 |
| 7,810,077 B2 * | 10/2010 | Bracha | .................... | G06F 8/315 717/118 |
| 7,823,121 B1 * | 10/2010 | Zarrinkoub | .............. | G06F 8/34 717/113 |
| 7,941,303 B1 * | 5/2011 | Raghavan | ................ | G06F 8/34 703/15 |
| 7,954,059 B2 * | 5/2011 | Macklem | .................. | G06F 8/34 715/234 |
| 7,975,233 B2 * | 7/2011 | Macklem | .................. | G06F 8/34 715/234 |
| 8,234,630 B2 * | 7/2012 | Raghavan | ................ | G06F 8/34 717/125 |
| 8,271,943 B2 * | 9/2012 | Hudson, III | ............. | G06F 8/34 717/113 |
| 8,423,981 B2 * | 4/2013 | Hudson, III | ............. | G06F 8/34 717/114 |
| 8,655,636 B2 * | 2/2014 | Kumar | .................... | G06F 9/444 703/13 |
| 8,782,599 B2 * | 7/2014 | Eldridge | .................... | G06F 8/34 717/110 |
| 8,793,602 B2 * | 7/2014 | Szpak | ..................... | G06F 9/542 345/173 |
| 8,943,466 B2 * | 1/2015 | Bray | ......................... | G06F 8/34 717/106 |
| 9,182,980 B2 * | 11/2015 | Campbell | .................. | G06F 8/72 |
| 9,411,559 B2 * | 8/2016 | Avadhanula | ............. | G06F 8/35 |
| 9,454,382 B2 * | 9/2016 | Adler | .................... | G06F 9/4494 |
| 9,507,572 B2 * | 11/2016 | Avadhanula | ............. | G06F 8/35 |
| 9,513,880 B2 * | 12/2016 | Avadhanula | ............. | G06F 8/35 |
| 9,547,481 B2 * | 1/2017 | Avadhanula | ............. | G06F 8/35 |
| 9,645,915 B2 * | 5/2017 | Bienkowski | ........ | G06F 11/3664 |
| 9,774,699 B2 * | 9/2017 | Ogilvie | ..................... | G06F 8/34 |
| 10,055,203 B2 * | 8/2018 | Avadhanula | ............. | G06F 8/35 |
| 2002/0170041 A1 * | 11/2002 | Shann | ....................... | G06F 8/54 717/116 |
| 2003/0046658 A1 * | 3/2003 | Raghavan | ................ | G06F 8/34 717/106 |
| 2004/0210592 A1 * | 10/2004 | Ciolfi | ........................ | G06F 8/34 |
| 2005/0096894 A1 * | 5/2005 | Szpak | ................ | G06F 17/5009 703/13 |
| 2005/0160397 A1 * | 7/2005 | Szpak | ..................... | G06F 9/542 717/104 |
| 2005/0216248 A1 * | 9/2005 | Ciolfi | .................. | G06F 17/5009 703/22 |
| 2006/0139587 A1 * | 6/2006 | Rossing | .............. | G03F 7/70483 355/53 |
| 2006/0236315 A1 * | 10/2006 | Bracha | .................... | G06F 8/315 717/168 |
| 2007/0067761 A1 * | 3/2007 | Ogilvie | ..................... | G06F 8/34 717/146 |
| 2007/0261019 A1 * | 11/2007 | Raghavan | ............... | G06F 9/443 717/105 |
| 2008/0022259 A1 * | 1/2008 | MacKlem | .................. | G06F 8/34 717/113 |
| 2008/0022264 A1 * | 1/2008 | Macklem | .................. | G06F 8/34 717/136 |
| 2008/0127058 A1 * | 5/2008 | Bray | ......................... | G06F 8/34 717/106 |
| 2008/0270920 A1 * | 10/2008 | Hudson | ..................... | G06F 8/34 715/763 |
| 2009/0327942 A1 * | 12/2009 | Eldridge | .................... | G06F 8/34 715/771 |
| 2010/0325617 A1 * | 12/2010 | Hudson, III | ............. | G06F 8/34 717/140 |
| 2011/0320178 A1 * | 12/2011 | Kumar | .................... | G06F 9/444 703/2 |
| 2013/0024837 A1 * | 1/2013 | Bienkowski | ........ | G06F 11/3664 717/109 |
| 2014/0165035 A1 * | 6/2014 | Campbell | .................. | G06F 8/72 717/121 |
| 2014/0359560 A1 * | 12/2014 | Avadhanula | ............. | G06F 8/35 717/105 |
| 2014/0359561 A1 * | 12/2014 | Avadhanula | ............. | G06F 8/35 717/105 |
| 2014/0359566 A1 * | 12/2014 | Avadhanula | ............. | G06F 8/35 717/109 |
| 2014/0359567 A1 * | 12/2014 | Avadhanula | ............. | G06F 8/35 717/109 |
| 2014/0359568 A1 * | 12/2014 | Avadhanula | ............. | G06F 8/35 717/109 |
| 2014/0359569 A1 * | 12/2014 | Avadhanula | ............. | G06F 8/35 717/109 |
| 2015/0106781 A1 * | 4/2015 | Adler | .................... | G06F 9/4436 717/104 |

OTHER PUBLICATIONS

The MathWorks, "Stateflow® 7, User's Guide", The MathWorks, Inc., Matlab and Simulink, © 1997-2011, 1509 pages.

* cited by examiner

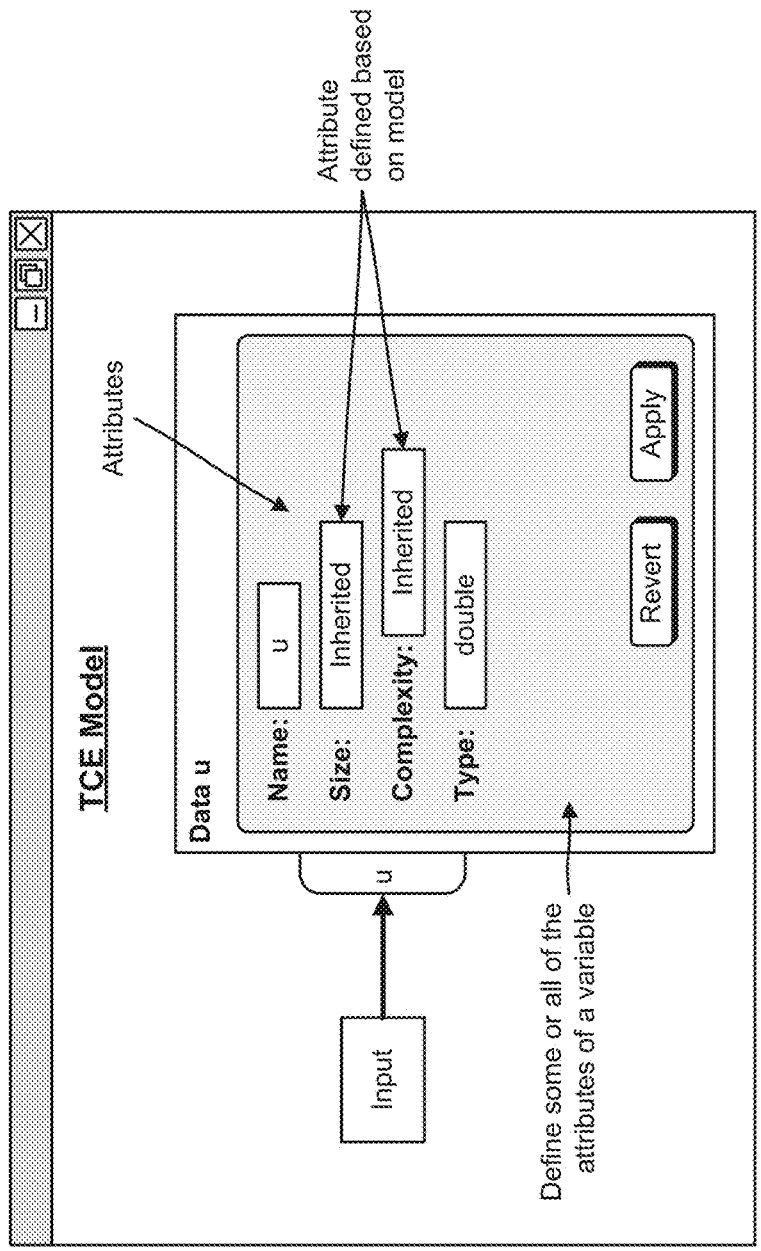

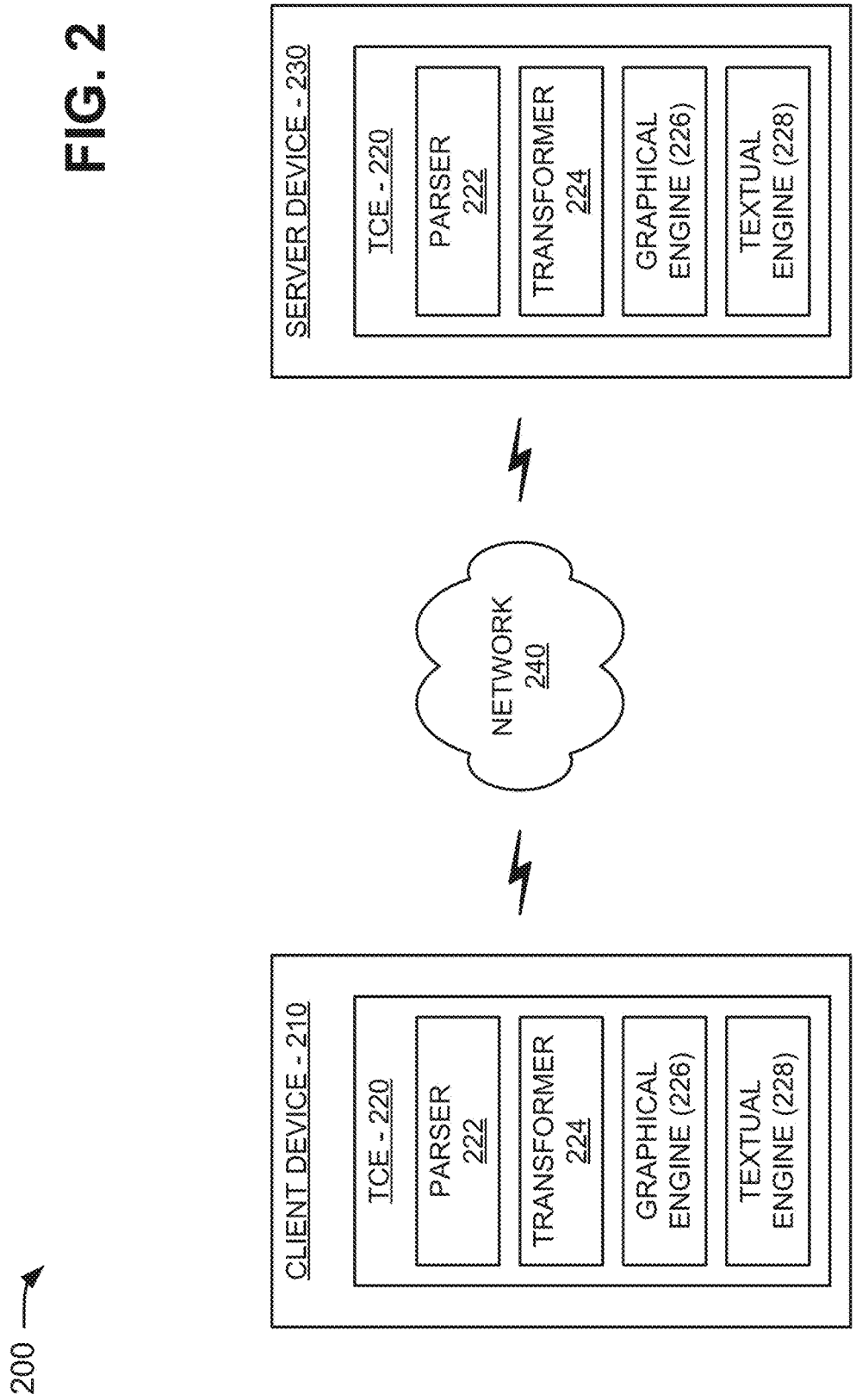

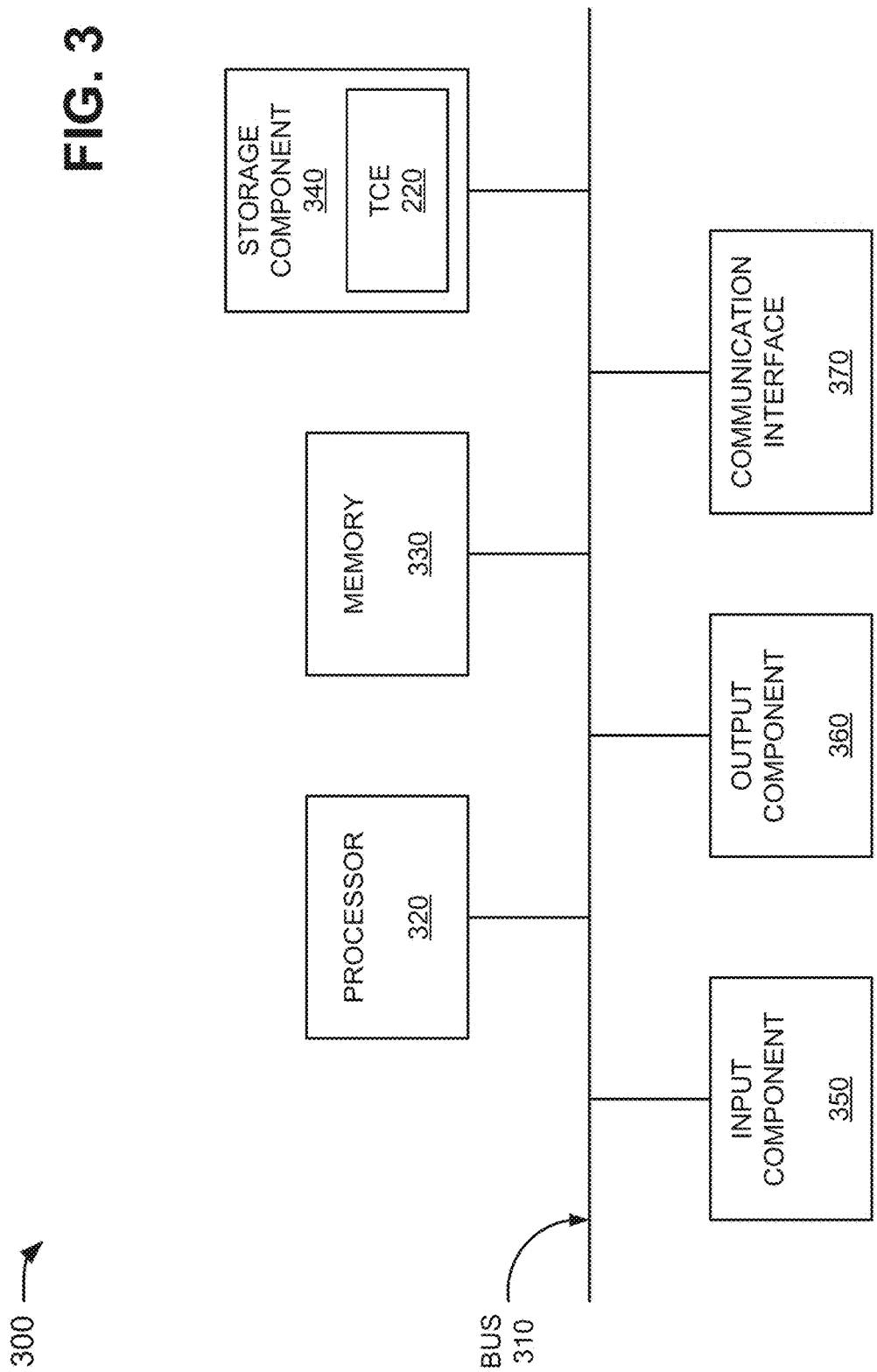

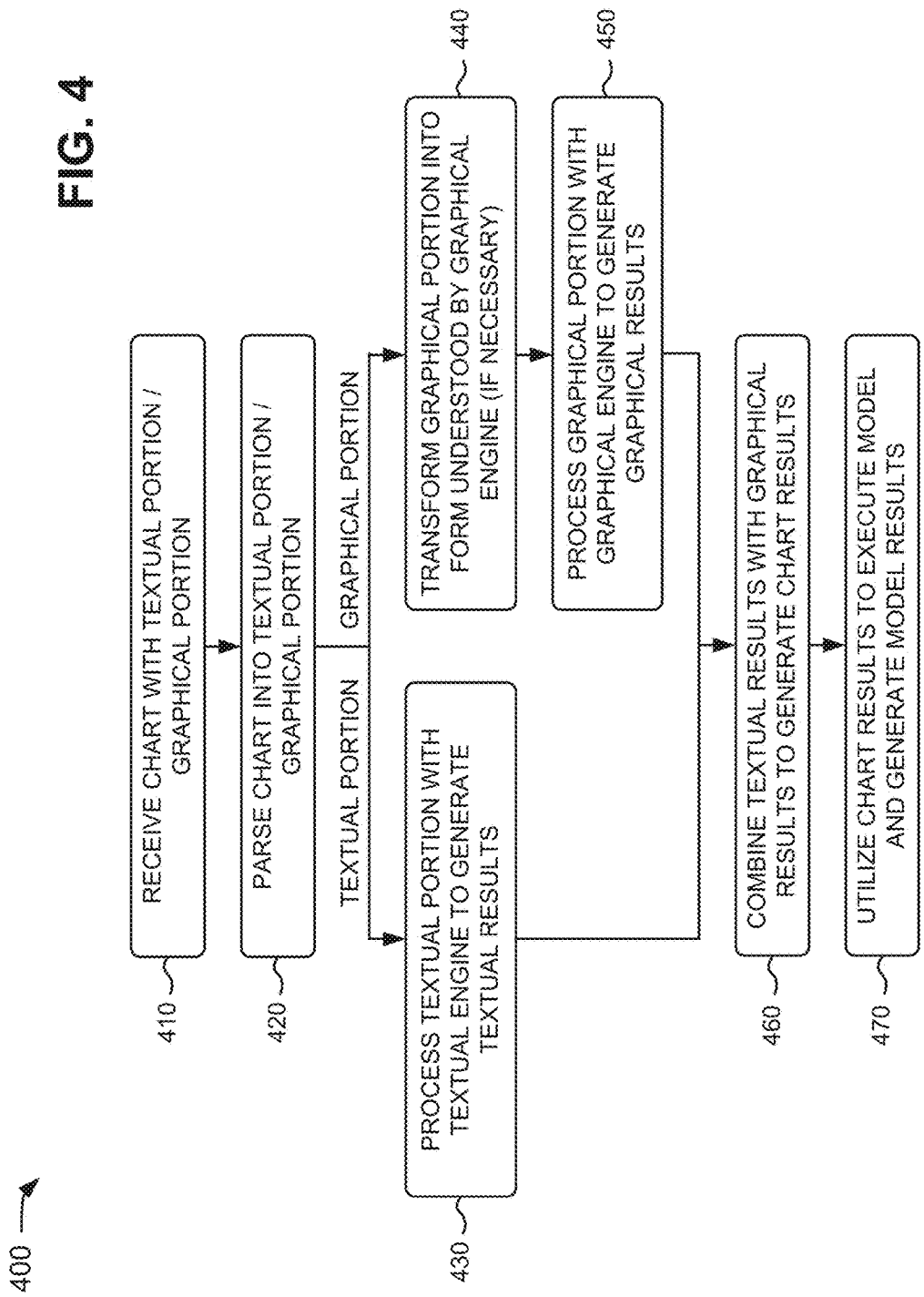

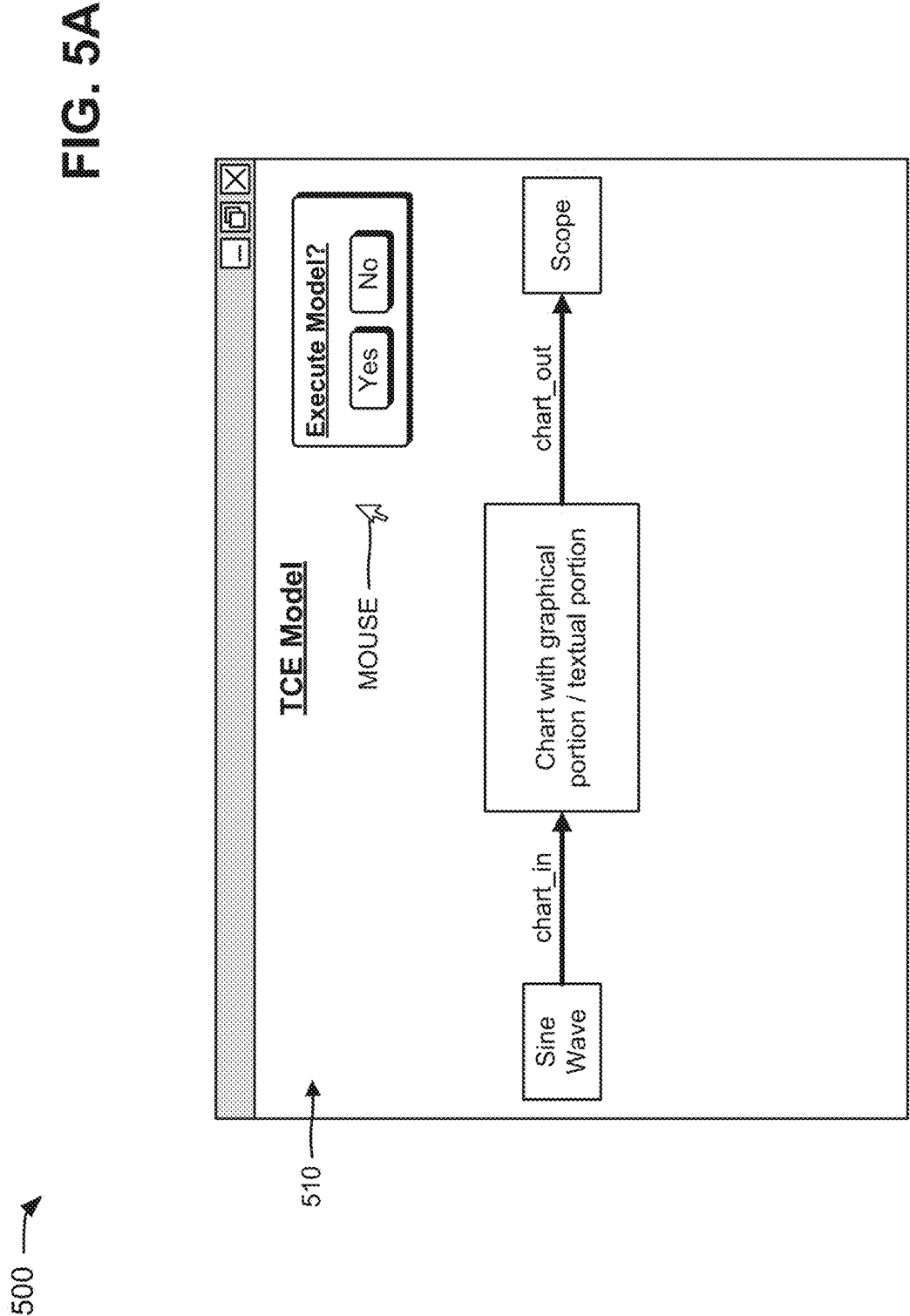

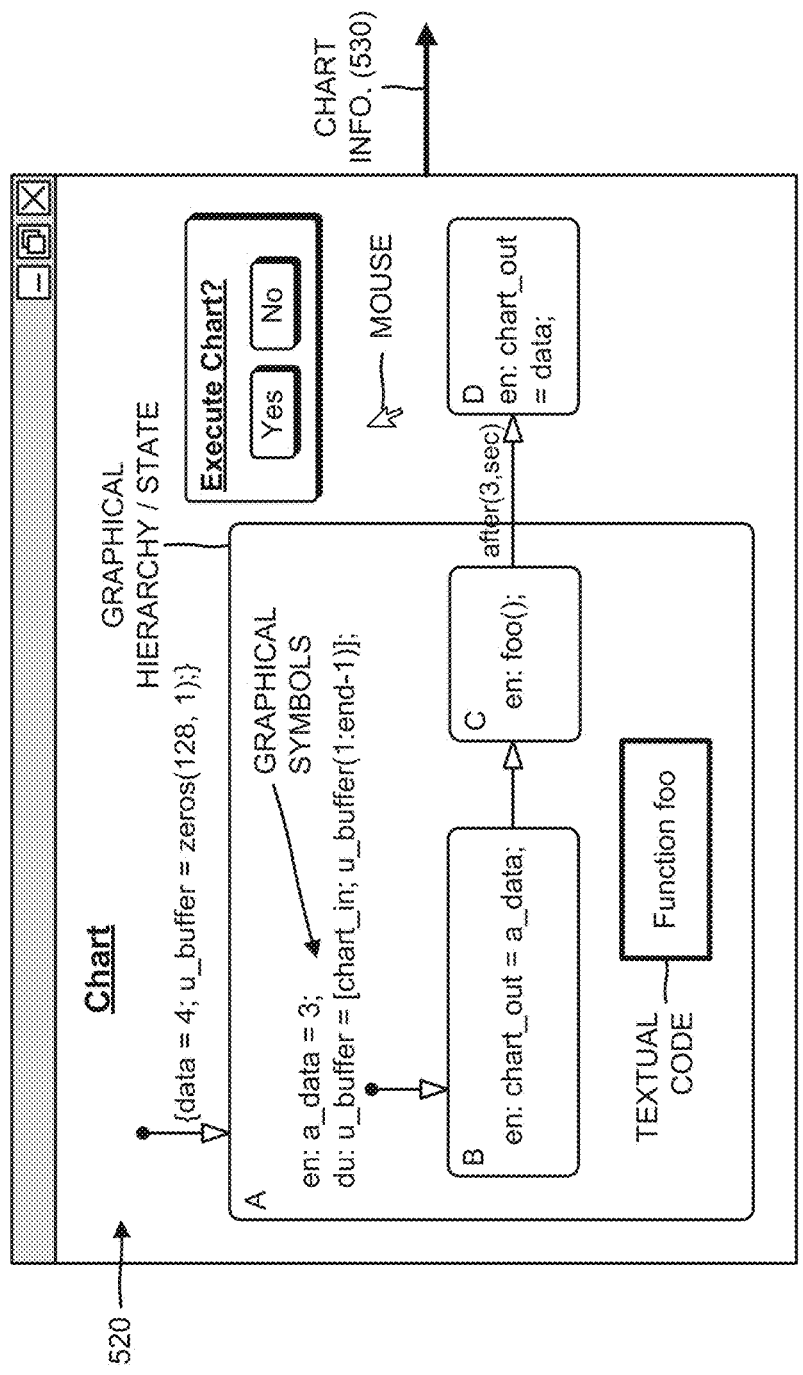

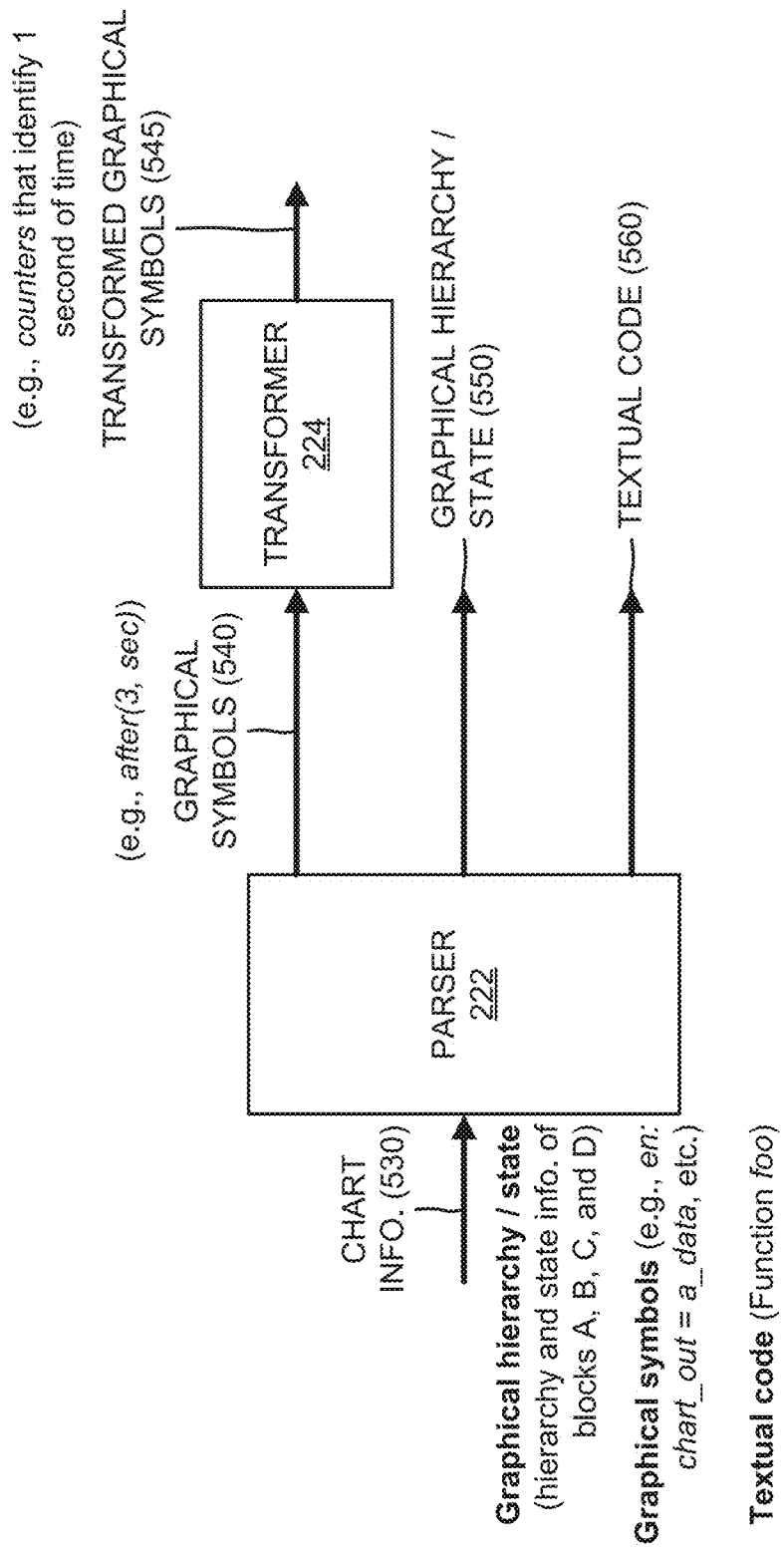

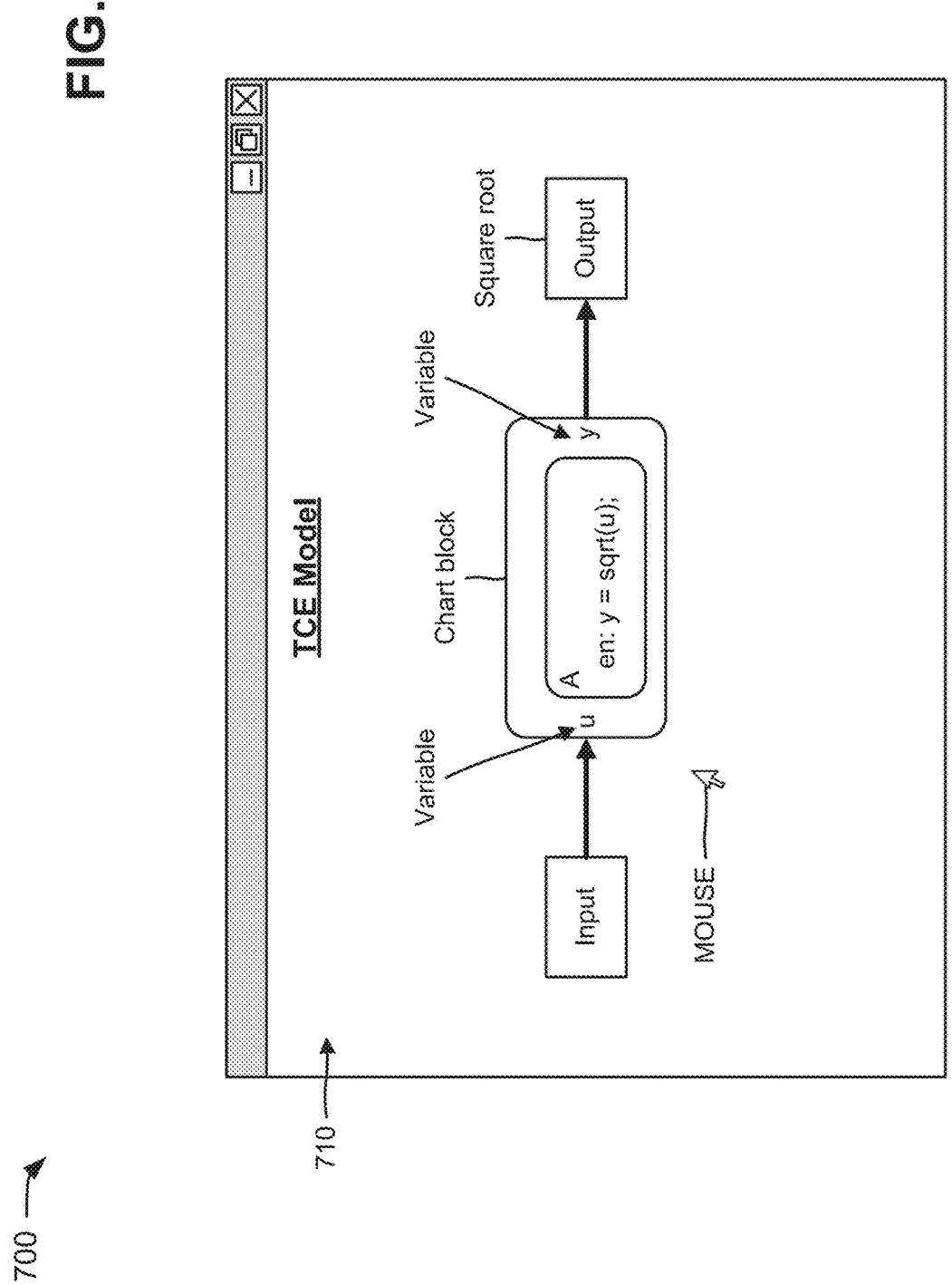

DEFINING ATTRIBUTES OF VARIABLES IN A STATE CHART OF A TECHNICAL COMPUTING ENVIRONMENT

RELATED APPLICATION

This application claims priority under 35 U.S.C. § 119 based on U.S. Provisional Patent Application No. 61/827,863, filed May 28, 2013, the disclosure of which is incorporated by reference herein in its entirety.

BRIEF DESCRIPTION OF THE DRAWINGS

FIGS. 1A and 1B are diagrams of an overview of an example implementation described herein;

FIG. 2 is a diagram of an example environment in which systems and/or methods described herein may be implemented;

FIG. 3 is a diagram of example components of one or more devices of FIG. 2;

FIG. 4 is a flow chart of an example process for processing textual and graphical portions of a technical computing environment chart;

FIGS. 5A-5E are diagrams of an example relating to the example process shown in FIG. 4;

FIGS. 7A-7E are diagrams of an example relating to the example process shown in FIG. 6.

DETAILED DESCRIPTION

The following detailed description of example implementations refers to the accompanying drawings. The same reference numbers in different drawings may identify the same or similar elements.

A technical computing environment (TCE) may include a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. The TCE may use an array, a vector, and/or a matrix as basic elements.

The TCE may provide a graphical environment for modeling and simulating combinatorial and sequential decision logic based on state machines and flow charts. The decision logic may enable users to combine graphical and tabular representations, including state transition diagrams, flow charts, state transition tables, and truth tables, to model how a system reacts to events, time-based conditions, and external input signals. The graphical environment may generate models, such as a textual model; a graphical model with one or more model elements (e.g., blocks), one or more input signals, and one or more output signals; a combination of a textual model and a graphical model; etc. The TCE may exist for creating computer-generated models, such as graphical behavioral models, that represent dynamic systems. A model may include a plurality of graphical objects, such as blocks or icons. A model may be executed to simulate the operation or behavior of the system being modeled. Executing the model may be referred to as simulating the model.

The TCE may provide a textual environment that includes a high-level language and an interactive environment for numerical computation, visualization, and programming. The textual environment may enable users to analyze data, develop algorithms, create models and applications, manipulate matrices, plot functions and data, implement algorithms, create user interfaces, and interface with programs written in other languages, including C, C++, Java, and Fortran. Unlike the graphical environment, which models how a system reacts to events and time-based conditions, the textual environment includes an imperative or declarative language with no concept of logical, model, physical, and/or simulation time and events.

Figure 1A:
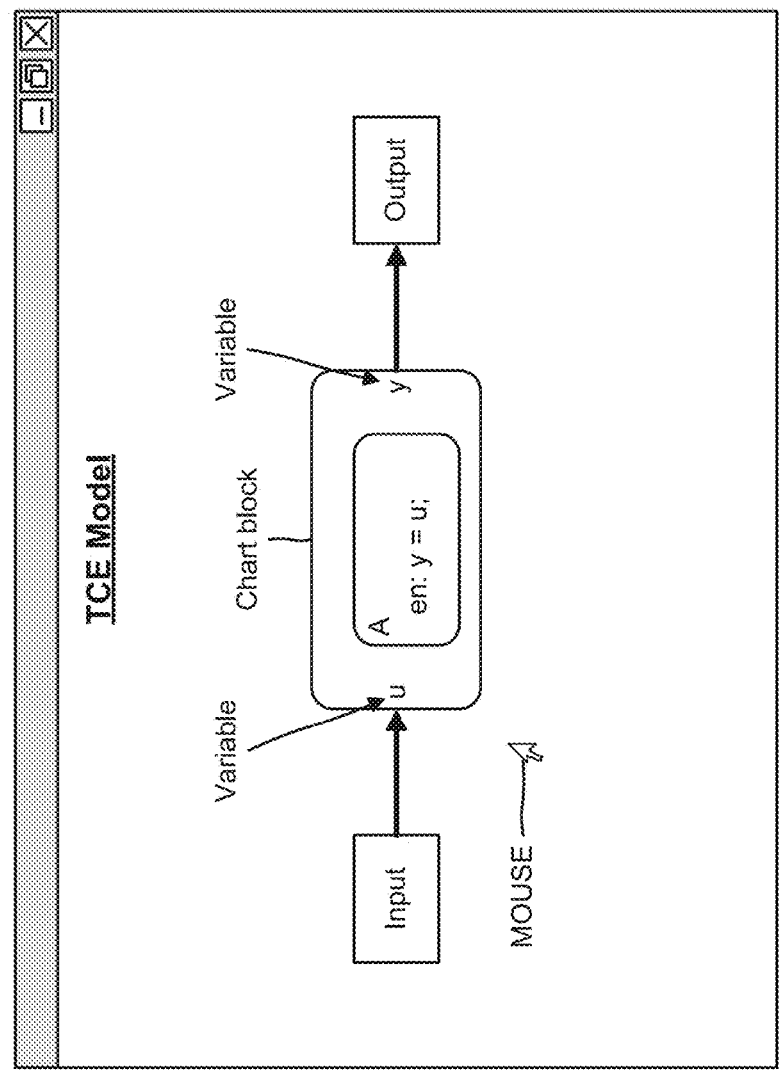

Conventional action languages for the graphical environment (e.g., Stateflow) consisted of statically-typed, scalar-based languages, such as, for example, C, C++, etc. FIGS. 1A and 1B are diagrams of an overview of an example implementation 100 described herein. In the example, a textual environment of the TCE may be provided in a graphical environment of the TCE. Time-based and event-based simulation may be introduced into the language of the textual environment, while maintaining the syntax and style of the language. The textual environment may include a dynamic language that enables variable attributes to be defined based on a reference to the variable in the dynamic language. For example, a variable may include a numeric type (e.g., a single precision type, a double precision type, a signed integer type, an unsigned integer type, etc.); a character type (e.g., text strings); a structure type (e.g., a structure array); a cell array type; etc. In the textual environment, the variable's type may be defined based on a reference to the variable in a script or a function (e.g., if code includes a line a=3.0, this line may define the variable a as a double precision type). The graphical environment may enable variable attributes to be defined independently of actual references to the variable. As described herein, the textual environment may be enhanced so that variable attributes may be defined independently of actual references to the variable, as in the graphical environment.

With reference to FIG. 1A, a user may utilize a TCE of a computing device to create a model that includes a chart. The model may include an input block, a chart block, and an output block. The input block may be associated with a representation of a physical device that provides an input signal (e.g., variable u provided by the textual environment) to the chart block. The chart block may include a representation of a chart that processes the input signal to generate an output signal (e.g., variable y provided by the textual environment). The chart block may provide the output signal to the output block. The output block may be associated with a representation of a physical device that receives the output signal and utilizes the output signal (e.g., displays the output signal).

The chart block may include a chart with a single state block (e.g., state block A). State block A may receive the input signal, and may calculate the output signal based on textual code (e.g., y=u) generated in the textual environment. State block A may provide the calculated output signal to the output block. As further shown in FIG. 1A, the user may utilize a selection mechanism (e.g., a mouse) to select any of the blocks of the model, the variables of the model, etc. Assume that the user selects the input variable (e.g., variable u) so that the user may define attributes associated with the input variable.

When the user selects the input variable, the TCE may cause the computing device to display a window or another display mechanism for defining attributes of the input variable, as shown in FIG. 1B. The attributes may include, for example, a size of the input variable, a complexity of the input variable, and a type of the input variable. The size of the input variable may include a number of dimensions associated with the input variable. For example, the size of the input variable may be set to 1 (e.g., one-dimensional variable), 2 (e.g., a two-dimensional variable), etc.; a user may utilize an array-based notation, such as specifying an instance [1 1; 1 1] to define a 2×2 variable, an expression such as M*N, where M and N are variables defined elsewhere in the TCE; etc. If the user sets the size of the input variable to inherited, as shown in FIG. 1A, the size of the input variable may be defined based on a reference to the input variable in a script or a function of the model.

The complexity of the input variable may include information defining whether the input variable is a complex number (e.g., expressed as a real number and an imaginary part). For example, the complexity of the input variable may be set to "On" (e.g., defining the input variable as a complex number) or "Off" (e.g., defining the input variable as a real number). If the user sets the complexity of the input variable to inherited, as shown in FIG. 1A, the complexity of the input variable may be defined based on a reference to the input variable in a script or a function of the model.

The type of the input variable may include a numeric type associated with the input variable. For example, the type of the input variable may be set to single (e.g., a single precision), double (e.g., a double precision), int8 (e.g., an 8-bit signed integer), int16 (e.g., a 16-bit signed integer), int32 (e.g., a 32-bit signed integer), int64 (e.g., a 64-bit signed integer), uint8 (e.g., an 8-bit unsigned integer), a fixed-point type (e.g., that defines a type that has a specified integral, fractional, and exponential part), etc. If the user sets the type of the input variable to inherited, the type of the input variable may be defined based on a reference to the input variable in a script or a function of the model.

As further shown in FIG. 1B, the user may define all of the attributes for the input variable or a subset of the attributes for the input variable. For example, the user may set the size and the complexity of the input variable to "inherited," but may specify the type of the input variable (e.g., as a double). When the attributes are partially defined by the user, the defined attributes may provide hints that enable the TCE to infer undefined attributes (e.g., the size and the complexity of the input variable). As further shown in FIG. 1B, the user may elect to apply the defined attributes in the model and the chart by selecting an "Apply" button. When the user selects the "Apply" button, the TCE may implement the defined attributes in the model and the chart during an analysis or execution of the model, and may attempt to infer undefined attributes from the defined attributes. The user may also elect to change the defined attributes back to previous definitions by selecting a "Revert" button. Selection of the "Revert" button may cause the TCE to reset the defined attributes to previous definitions.

Such an arrangement may enable a user of a TCE to leave one or more attributes of variables undefined (e.g., set as inherited) in the early stages of model development. As the model becomes more developed and more is known about the variables, the user may begin defining more and more attributes of the variable. The TCE may infer one or more of the undefined variable attributes, may check the consistency of defined variable attributes, and may generate an error or warning message if check consistency check provides a different type than a defined variable attribute. In some implementations, the TCE may ensure that user-defined properties of a variable are consistent with the way that the variable is defined in the textual environment. Alternatively, or additionally, the TCE may transform textual definitions to be compliant with a definition of a variable provided by the user. For example, if the user specifies that a type is uint8 and the user types an equation (e.g., y=2) in the textual environment, the TCE may transform the equation into y=uint8(2).

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include a device capable of receiving, generating, storing, processing, executing, and/or providing information in a manner described herein. For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may receive information from and/or transmit information to server device 230.

TCE 220 may be provided within a computer-readable medium of client device 210. Alternatively, or additionally, TCE 220 may be provided in another device (e.g., server device 230) that is accessible by client device 210. TCE 220 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 220 may include a dynamically-typed programming language (e.g., the M language, a MATLAB® language, a MATLAB-compatible language, a MATLAB-like language, etc.) that can be used to express problems and/or solutions in mathematical notations. A model may be declarative in that the model may not allow the user to explicitly specify when a state of a machine that the model is executing on changes. In a declarative model, the user may not explicitly specify an order in which state changes in the model. In an imperative model, the user may explicitly specify when a particular state may change (e.g., relative to other state changes).

For example, TCE 220 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 220 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 220 may further provide mathematical functions and/or graphical tools (e.g., for creating plots, surfaces, images, volumetric representations, etc.). In some implementations, TCE 220 may provide these functions and/or tools using toolboxes (e.g., toolboxes for signal processing, image processing, data plotting, parallel processing, etc.). In some implementations, TCE 220 may provide these functions as block sets or in another way, such as via a library, etc.

TCE 220 may be implemented as a text-based environment (e.g., MATLAB software; Octave; Python; JavaScript; Comsol Script; MATRIXx from National Instruments; Mathematica from Wolfram Research, Inc.; Mathcad from Mathsoft Engineering & Education Inc.; Maple from Maplesoft; Extend from ImagineThat Inc.; Scilab from The French Institution for Research in Computer Science and Control (INRIA); Virtuoso from Cadence; Modelica or Dymola from Dassault Systemes; etc.); and a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dassault Systemes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.). In some implementations, TCE 220 may include a hybrid environment that includes one or more of the above-referenced text-based environments and one or more of the above-referenced graphically-based environments. In some implementations, a Stateflow chart may be embedded in a Simulink environment and/or multi-domain modeling and simulation (e.g., models of computation).

TCE 220 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3].

Now suppose the program is executed, for example, in a TCE, such as TCE 220. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 220 may provide mathematical routines and a high-level programming language suitable for non-professional programmers and may provide graphical tools that may be used for creating plots, surfaces, images, volumetric representations, or other representations. TCE 220 may provide these routines and/or tools using toolboxes (e.g., toolboxes for signal processing, image processing, data plotting, parallel processing, etc.). TCE 220 may also provide these routines in other ways, such as, for example, via a library, local or remote database (e.g., a database operating in a computing cloud), remote procedure calls (RPCs), and/or an application programming interface (API). TCE 220 may be configured to improve runtime performance when performing computing operations. For example, TCE 220 may include a just-in-time (JIT) compiler.

In some implementations, TCE 220 may provide a graphical environment for modeling and simulating combinatorial and sequential decision logic based on state machines and flow charts. The decision logic may enable users to combine graphical and tabular representations, including state transition diagrams, flow charts, state transition tables, and truth tables, to model how a system reacts to events, time-based conditions, and external input signals. The graphical environment may generate models, such as a textual model; a graphical model with one or more model elements (e.g., blocks), one or more input signals, and one or more output signals; a combination of a textual model and a graphical model; etc.

In some implementations, TCE 220 may provide a textual environment that includes a high-level language and an interactive environment for numerical computation, visualization, and programming. The textual environment may enable users to analyze data, develop algorithms, create models and applications, manipulate matrices, plot functions and data, implement algorithms, create user interfaces, and interface with programs written in other languages, including C, C++, Java, and Fortran. Unlike the graphical environment, which models how a system reacts to events and time-based conditions, the textual environment may include an assignment-based, imperative language with no concept of logical, model, physical, and/or simulation time and events.

In some implementations, and as further shown in FIG. 2, TCE 220 may include a parser 222, a transformer 224, a graphical engine 226, and a textual engine 228. Parser 222 may include a component that parses TCE code (e.g., a model or a chart) into a graphical portion and a textual portion. The graphical portion may include information associated with a graphical hierarchy, graphical symbols, etc. of the TCE code. The textual portion may include information associated with textual code of the TCE code that may be understood by textual engine 228. In some implementations, parser 222 may parse the textual portion into two or more portions (e.g., a time-based portion and an output portion), and may parse the graphical portion into two or more portions (e.g., a functional portion and a non-functional portion). In some implementations, parser 222 may parse TCE code into other types of portions.

Transformer 224 may include a component that receives the graphical portion of the TCE code that is not understood by graphical engine 226. For example, one or more graphical symbols may not be understood by graphical engine 226 and may be provided to transformer 224. Transformer 224 may transform the received graphical portion into a form that is understood by graphical engine 226.

Graphical engine 226 may receive the transformed graphical portion and the graphical portion that did not need to be transformed, and may process the received information. The processing of the received information may include generating graphical results, such as, for example, how a system reacts to events, time-based conditions, and external input signals. In some implementations, graphical engine 226 may include Simulink® software, Stateflow® software, Simscape™ software, and/or SimEvents® software.

Textual engine 228 may receive the textual portion, and may process the textual portion to generate textual results, such as, for example, data analysis results, matrix calculation results, array calculation results, etc. Graphical engine 226 may combine the graphical results with the textual results to generate combined results that may be understood by the graphical environment and the textual environment. In some implementations, textual engine 228 may include MATLAB software.

Server device 230 may include one or more devices capable of receiving, generating, storing, processing, executing, and/or providing information in a manner described herein. For example, server device 230 may include a computing device, such as a server, a desktop computer, a laptop computer, a tablet computer, a handheld computer, or a similar device. In some implementations, server device 230 may host TCE 220.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for processing textual and graphical portions of a technical computing environment chart. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving a chart with a textual portion and a graphical portion (block 410). For example, TCE 220 may enable a user of client device 210 to create a model or to instruct client device 210 to receive the model from another source (e.g., server device 230, a CD-ROM, a flash memory, etc.). In some implementations, the model may include a chart with a graphical hierarchy of one or more chart elements (e.g., areas or regions associated with one or more states, referred to herein as "state blocks"), one or more input signals, and one or more output signals. For example, assume that a chart has state blocks A, B, and C, and that state block A includes state block B and a transition to state block C. An arrangement that includes a state block containing one or more state blocks and/or transitions to one or more state blocks may be referred to as a graphical hierarchy. Each of the chart elements may correspond to a status of a physical device, a subsystem, a model, etc. of a system being modeled (e.g., chart elements may behavioral so that a state may correspond to a status of a device, a subsystem, etc.).

In some implementations, the chart may include graphical symbols, transitions, and/or state transitions associated with the state blocks of the chart. The graphical symbols may include, for example, textual information that provides event-based conditions, time-based conditions, invariants, etc. to the state blocks, transitions, junctions, etc. In some implementations, one or more of the state blocks, transitions, and/or state transitions, may include textual code that may be understood and processed by textual engine 228 of TCE 220. The textual code may include, for example, one or more functions, matrices, data, etc. that may be understood and processed by textual engine 228.

In some implementations, TCE 220 may cause client device 210 to display a user interface so that the user may create and/or view the model and the chart. For example, the user may utilize the user interface to create the state blocks for the chart, and to connect the state blocks together. The user may associate the graphical symbols with the state blocks and/or other elements of the chart (e.g., transitions, state transitions, junctions, etc.), and may add the textual code in the one or more state blocks. The user may utilize the user interface to provide the chart within the model.

As further shown in FIG. 4, process 400 may include parsing the chart into a textual portion and a graphical portion (block 420). For example, parser 222 of TCE 220 may receive information associated with the chart, and may identify, based on the information, a portion of the chart that may be understood and processed by textual engine 228 (e.g., a textual portion) and a portion of the chart that may be understood and processed by graphical engine 226 (e.g., a graphical portion). In some implementations, parser 222 may have access to a data structure (e.g., a database) that stores syntax associated with the language of the textual environment of TCE 220 (e.g., and understood by textual engine 228). Parser 222 may compare the chart information with the syntax stored in the data structure, and may determine that particular portions of the chart information match the syntax. Parser 222 may designate the matching portions of the chart information as the textual portion. For example, parser 222 may designate functions, arrays, matrices, algorithms, etc. in the chart as the textual portion.

In some implementations, parser 222 may have access to a data structure (e.g., a database) that stores information associated with the graphical environment of TCE 220 (e.g., and understood by graphical engine 226). Parser 222 may compare the chart information with information stored in the data structure, and may determine that particular portions of the chart information match the information in the data structure. Parser 222 may designate the matching portions of the chart information as the graphical portion. For example, parser 222 may designate time-based conditions, event-based conditions, other conditions, hierarchy information, etc. as the graphical portion.

As further shown in FIG. 4, for the textual portion (block 420—TEXTUAL PORTION), process 400 may include processing the textual portion with the textual engine to generate textual results (block 430). For example, parser 222 may provide the textual portion of the chart to textual engine 228, and textual engine 228 may process the textual portion of the chart to generate textual results. In some implementations, textual engine 228 may execute the textual portion of the chart to generate the textual results. For example, assume that the textual portion of the chart includes a function for performing matrix calculations on data. In such an example, textual engine 228 may execute the function so that the matrix calculations are performed on the data. The matrix resulting from the calculations may be referred to as textual results. In another example, assume that the textual portion of the chart includes an algorithm for performing data analysis. In this example, textual engine 228 may execute the algorithm so that the data analysis is performed. The results of the data analysis may be referred to as textual results.

As further shown in FIG. 4, for the graphical portion (block 420—GRAPHICAL PORTION), process 400 may include transforming, if necessary, the graphical portion into a form understood by the graphical engine (block 440). For example, parser 222 may determine whether any of the graphical portion of the chart will not be understood by graphical engine 226. In some implementations, parser 222 may identify text in the graphical portion that may not be understood by graphical engine 226. For example, assume that the graphical portion includes the text before(abs(a*eig (b(1:10, 1:10))), sec), and that graphical engine 226 does not understand the text since graphical engine 226 needs to calculate a time to execute the text. In this example, parser 222 may provide the text to transformer 224, and transformer 224 may transform the text into a form understood by graphical engine 226. For example, transformer 224 may transform the text to utilize counters maintained by the graphical environment (e.g., Simulink) so that a time (e.g., one second, two seconds, etc.) may be calculated by graphical engine 226. In some implementations, transformer 224 may provide the transformed text to graphical engine 226 for processing. In some implementations, the text provided in the graphical portion may include textual operations (e.g., after(abs(a*eig(b(1:10, 1:10))), sec)) that are understood by the textual environment, such as, for example, TCE operations.

In some implementations, parser 222 may provide the remaining graphical portion (e.g., which may be understood by graphical engine 226) directly to graphical engine 226. In some implementations, parser 222 may determine that all of the graphical portion may be understood by graphical engine 226. In such a situation, parser 222 may provide the entire graphical portion to graphical engine 226 and transformer 224 may not be utilized.

As further shown in FIG. 4, for the graphical portion (block 420—GRAPHICAL PORTION), process 400 may include processing the graphical portion with the graphical engine to generate graphical results (block 450). For example, parser 222 may provide, to graphical engine 226, the graphical portion of the chart that is understood by graphical engine 226. Transformer 224 may provide, to graphical engine 226, any of the graphical portion that has been transformed into a form that is understood by graphical engine 226. Graphical engine 226 may process the graphical portion of the chart to generate graphical results. In some implementations, graphical engine 226 may execute the graphical portion of the chart to generate the graphical results. For example, assume that the graphical portion of the chart includes instructions to combine graphical and tabular representations. In such an example, graphical engine 226 may execute the instructions so that the graphical and tabular representations are combined. The resulting combination may be referred to as graphical results. In another example, assume that the graphical portion of the chart includes an event-based condition (e.g., transition to state block A when a function is calculated). In this example, graphical engine 226 may execute the event-based condition so that state block A is transitioned to. The results of the execution of the event-based condition may be referred to as graphical results. In some implementations, graphical engine 226 may execute textual information.

As further shown in FIG. 4, process 400 may include combining the textual results with the graphical results to generate chart results (block 460). For example, TCE 220 may combine the textual results, generated by textual engine 228, with the graphical results generated by graphical engine 226 to generate chart results. In some implementations, the chart results may include results associated with execution of the chart. For example, assume that the textual results include a calculation of a function bar and that the graphical results include utilizing the calculation when a state block B is transitioned to. In such an example, the chart results may include transitioning to state block B and utilizing the calculation of the function bar. In another example, assume that the textual results include performing a matrix calculation and that the graphical results include computing the time period based on the array-based computations. In such an example, the chart results may include determining when the time period has expired and utilizing the matrix calculation after the time period has expired and/or utilizing the matrix calculation to determine the time period. In some implementations, the chart may model reactive systems via state machines and flow charts within a model. In some implementations, the chart may use a variant of a finite-state machine notation, which may enable representation of hierarchy, parallelism, event broadcast, and/or history within the chart. In some implementations, the chart may provide state transition tables and/or truth tables. In some implementations, the chart may represent discrete modes of a system by a state, may control how a system responds to faults and failures within the system, and may schedule when specific tasks occur (e.g., either within the chart or within an overall model).

As further shown in FIG. 4, process 400 may include utilizing the chart results to execute the model and generate model results (block 470). For example, TCE 220 may utilize the chart results in the model (e.g., during execution of the model) to generate model results. In some implementations, the model results may include results associated with execution of the model based on the chart results. For example, assume that the chart results include transitioning to state block B and utilizing a calculation of a function bar. After state block B is transitioned to and the function bar is calculated, TCE 220 may utilize the function calculation in the model to generate the model results. In another example, assume that the chart results include determining when a time period has expired and utilizing the computations to determine the time period. After the matrix calculation is performed, TCE 220 may utilize the matrix calculation in the model to generate the model results and/or to determine the time period.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5D:
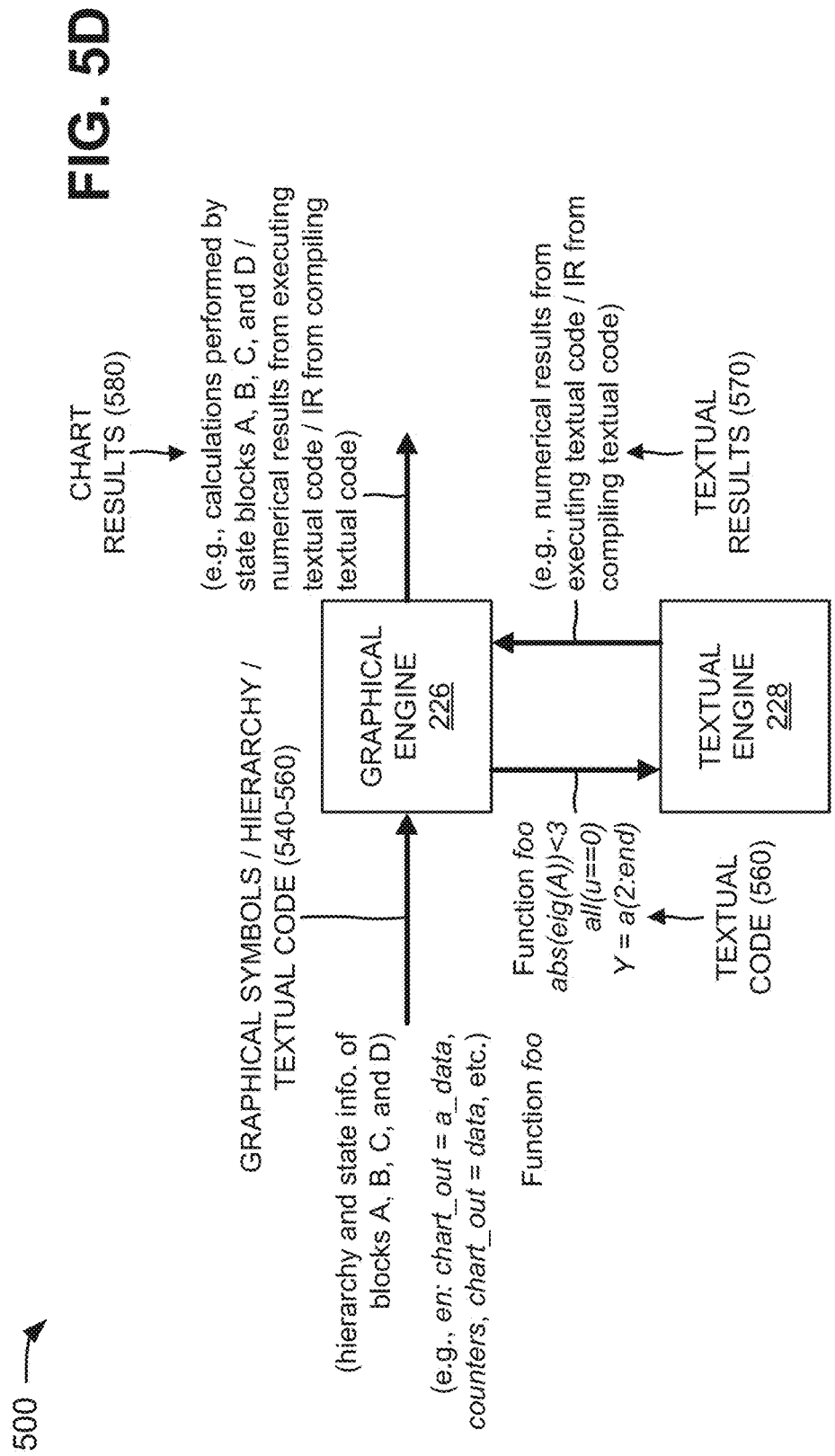

FIGS. 5A-5E are diagrams of an example 500 relating to example process 400 shown in FIG. 4. In example 500, assume that a user of client device 210 utilizes TCE 220 to create a model or to import the model into TCE 220. As shown in FIG. 5A, TCE 220 may cause client device 210 to display the model in a user interface 510. The model may include a sine wave block, a chart block, and a scope block.

The sine wave block may include a representation of a sine wave that is to be displayed by the scope block. In example 500, assume that the sine wave block provides a chart_in signal (e.g., a sine wave signal) to the chart block. The chart block may include a representation of a chart that processes the sine wave signal so that it may be understood by the scope block. The chart block may include a graphical portion and a textual portion. The chart block may receive the chart_in signal, and may process the chart_in signal to produce a chart_out signal (e.g., a voltage/time signal to be displayed by the scope block). The chart block may provide the chart_out signal to the scope block. The scope block may include a representation of an oscilloscope that displays constantly varying signal voltages as a function of time. The scope block may receive the chart_out signal, and may display the signal (e.g., a voltage/time signal). In some implementations, the chart block may include a chart (FIG. 5B) that may be executed based on different execution semantics provided by a user and/or inferred from the model. The execution semantics may include dynamic notions associated with continuous time for example, computing the time derivatives of a dynamic system based on matrix calculations, etc. In some implementations, the chart may be provided in an environment that includes multiple domains.

As further shown in FIG. 5A, TCE 220 may instruct client device 210 to display an option to execute the model. For example, user interface 510 may display a window or some other display mechanism that requests whether the user wants to execute the model. If the user elects to execute the model (e.g., via selection of a "Yes" button with a mouse or other selection mechanism), TCE 220 may execute the model. In some implementations, the user may select a "Play" button with the mouse, and TCE 220 may execute the model. In order to execute the model, assume that TCE 220 needs to execute the chart block, as shown in a user interface 520 of FIG. 5B. In some implementations, the model may include computational semantics associated with graphical and textual elements, and may include computational semantics associated with various blocks in the model. In some implementations, TCE 220 may debug the model before or during execution of the model or generation of code.

As shown in user interface 520, the chart may include a graphical hierarchy of state blocks A, B, C, and D. The graphical hierarchy may include the arrangement of the state blocks in the chart. For example, state block A may be transitioned to first, state block B may be transitioned to second, state block C may be transitioned to third, and state block D may be transitioned to last. The state blocks may include state information provided by graphical symbols. For example, state block A may include the graphical symbols en: a_data=3 and du: u_buffer=[chart_in; u_buffer (1:end-1)] (e.g., which may be parsed by graphical engine 226 into a portion "du" that may be understood by graphical engine 226 and another portion "u_buffer=[chart_in; u_buffer(1:end-1)]" that may be understood by textual engine 228); state block B may include the graphical symbols en: chart_out=a_data; state block C may include the graphical symbols en: foo( ); and state block D may include the graphical symbols en: chart_out=data. Some or all of the graphical hierarchy, state blocks A, B, C, and D, and the graphical symbols may be understood by graphical engine 226. State block A may also include textual code (e.g., a function foo) that may be understood by textual engine 228. In some implementations, the textual code may include text for a function (e.g., foo, bar, etc.), text for a matrix (e.g., C=[1, 2, 3]), array-based text, dynamically-typed text, dynamic assignments, script or function name spaces, etc. (e.g., text that ignores certain output arguments, a function with logic that involves a caller's number of output arguments, fixed point quantities that use integer containers to specify approximate floating point values). In some implementations, graphical engine 226 may execute graphical code and textual code (e.g., C code), but may not execute dynamically-typed and/or array-based code. In some implementations, textual engine 228 may execute the dynamically-typed, array-based code.

As further shown in FIG. 5B, when the chart wakes up, the default transitions of the chart may be executed. For example, an action in a default transition (e.g., {data=4; u_buffer=zeros(128, 1);}) may be executed, and state block A may be marked as active. Graphical symbols of state block A (e.g., an entry action en: a_data=3) may be executed, and default transitions inside state block A may be executed to establish an active child of state block A (e.g., mark state block B as active). Graphical symbols of state block B (e.g., an entry action en: chart_out=a_data) may be executed, and the chart execution may be complete (e.g., the chart may go to sleep) since no child states remain. When the chart sleeps, state blocks A and B may be active. A next time the chart wakes up, graphical symbols of state block A (e.g., the during action du: u_buffer=[chart_in; u_buffer(1:end-1)]) may be executed since there are no direct outer transitions of state block A. Outer transitions of state block B may be checked, and, since there is no condition, the transition to state block C may be assumed to be true. Therefore, the chart may transition from state block B to state block C. State block C may become active and state block A may remain active. The chart may keep waking up according to solver settings and/or system dynamics, and may wake up many times or a few times. Every time the chart wakes up, the outer transitions of all active state blocks may be checked, for example, in a top-down manner. If an outer transition of a particular state block is not true, a during action of the particular state block may be executed. Otherwise, a transition may occur to a next state block. This may result in one or more executions of the during action of state block A (e.g., du: u_buffer=[chart_in; u_buffer(1:end-1)]).

At some point, the chart may wake up, with a condition specified in an outer transition of state block C (e.g., after(3, sec)) being true, after state block C is first entered. When this condition is true, a transition from state block C may occur. State block C may be marked as inactive when state block C is exited. State block A may be marked as inactive since the outer transition of state block C (e.g., after(3, sec)) leaves a graphical boundary of state block A. State block C may transition to state block D, and state block D may be marked as active. At this time, only state block D may be active in the chart. Graphical symbols of state block D (e.g., an entry action en: chart_out=data) may be executed at this time.

As further shown in FIG. 5B, TCE 220 may instruct client device 210 to display an option to execute the chart or may automatically execute the chart when the model is executed. For example, user interface 520 may display a window or some other display mechanism that requests whether the user wants to execute the chart. If the user elects to execute the chart (e.g., via selection of a "Yes" button with a mouse or other selection mechanism), TCE 220 may execute the chart to generate chart information 530, as further shown in FIG. 5B. Chart information 530 may include information associated with the graphical hierarchy, state blocks A, B, C, and D, the graphical symbols, the textual code, and/or execution of the graphical hierarchy, state blocks A, B, C, and D, the graphical symbols, and/or the textual code. In some implementations, the chart may be executed based on conditions in a model (e.g., a time-based block diagram model). For example, if a temperature in a model of an HVAC system exceeds a certain value (e.g., at a particular time), a status of a heater device may change from on to off.

In some implementations, TCE 220 may begin searching at a lowest level of the graphical hierarchy for data and/or a function and move up the graphical hierarchy level by level until the data/function is found. In some implementations, TCE 220 may include a global or logical workspace that may be searched first or last, for example, for data and/or a function. In some implementations, TCE 220 may execute the chart by executing one or more transitions, by executing in microsteps, by executing all events and actions at a hierarchical level, etc. Each microstep may result in a set of transitions that result in a stable state configuration (e.g., the result of one state chart execution). A state machine may continue to execute microsteps until no state transitions are possible from a current state configuration.

As shown in FIG. 5C, assume that TCE 220 provides chart information 530 to parser 222. For example, TCE 220 may provide, to parser 222, the information associated with the graphical hierarchy and the state of the chart (e.g., the hierarchy and active state information of state blocks A, B, C, and D); the information associated with the graphical symbols (e.g., chart_out=data, after(3, sec), etc.); the information associated with the textual code (e.g., the function foo); and/or the execution of the graphical hierarchy, state blocks A, B, C, and D, the graphical symbols, and/or the textual code. Parser 222 may parse chart information 530 into information 540 associated with graphical symbols that are not understood by graphical engine 226; information 550 associated with the graphical hierarchy and state blocks A, B, C, and D; and information 560 associated with the textual code.

Information 540 may not be generated if all of the graphical symbols, in chart information 530, are understood by graphical engine 226. In such a situation, parser 222 may provide information 540 associated with the graphical symbols directly to graphical engine 226. In one example, information 540 may include the text after(3, sec) or after (abs(a*eig(b(1:10, 1:10))), sec), which may not be understood by graphical engine 226 since graphical engine 226 does not understand TCE language syntax (e.g., abs(a*eig (b))). In this example, parser 222 may provide the text to transformer 224, and transformer 224 may transform the text into a form understood by graphical engine 226 (e.g., transformed graphical symbols 545, as shown in FIG. 5C). For example, transformer 224 may transform the text to utilize counters maintained by the graphical environment (e.g., Simulink) so that a time (e.g., one second, two seconds, etc.) may be calculated by graphical engine 226. Information 550 associated with the graphical hierarchy and state blocks A, B, C, and D may include, for example, the hierarchy and state information of state blocks A, B, C, and D, information identifying that state A is a parent state for state B, etc. Information 560 associated with the textual code may include, for example, information associated with the function foo.

As shown in FIG. 5D, graphical engine 226 may receive information 540 associated with graphical symbols (e.g., chart_out=a_data), transformed graphical symbols 545 (e.g., counters), information 550 associated with the graphical hierarchy and state (e.g., the hierarchy and state information of state blocks A, B, C, and D), and information 560 associated with the textual code (e.g., the functions foo, abs(eig(A))<3, all(u==0), and Y=a(2:end)). In some implementations, information 560 associated with the textual code may include zero crossing detection and location information, for example, to determine when discrete events occur.

Graphical engine 226 may provide information 560 associated with textual code to textual engine 228. Textual engine 228 may process information 560 to generate textual results 570. In example 500, assume that textual results 570 include numerical results from executing the textual code (e.g., the function foo) and/or an intermediate representation (IR) from compiling the textual code. Textual engine 228 may provide textual results 570 to graphical engine 226. Graphical engine 226 may process information 540, transformed graphical symbols 545, information 550, and textual results 570 to generate chart results 580. In example 500, assume that chart results 580 include the calculations performed by one or more of state blocks A, B, C, and/or D, numerical results from executing the textual code (e.g., the function foo), and/or an intermediate representation (IR) from compiling the textual code.

Figure 5E:
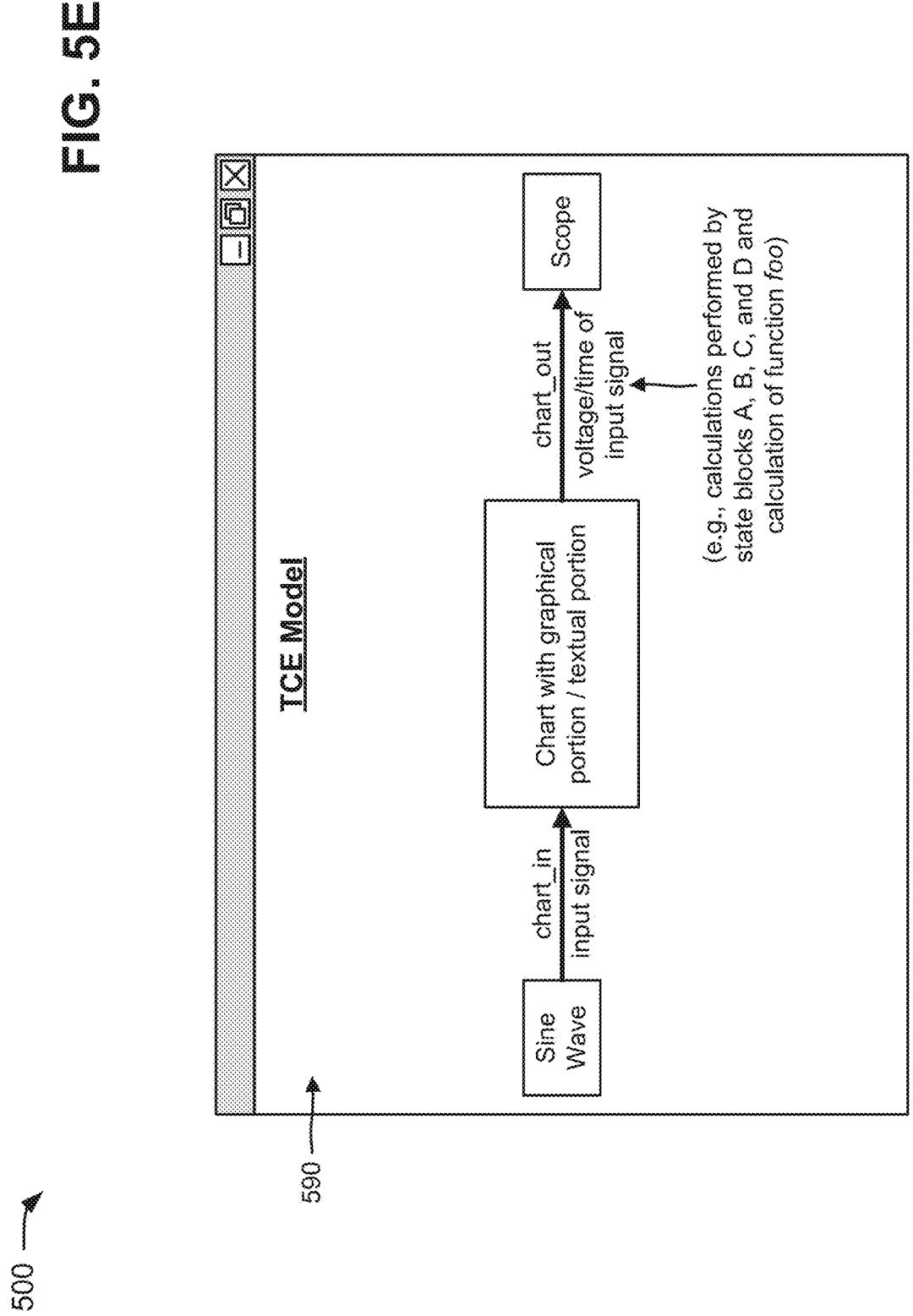

After one or more portions of the chart are executed and chart results 580 are generated, TCE 220 may utilize chart results 580 to execute the model. For example, as described above in connection with FIG. 5B, the chart may wake up and execute one or more of state blocks A, B, C, and D. In some implementations, the chart may execute one or more portions of a model and/or the model may execute one or more portions of the chart. As shown in FIG. 5E, TCE 220 may cause client device 210 to display a user interface 590 that includes the executed model. As shown in user interface 590, the chart block may receive an input signal (e.g., a sine wave) from the sine wave block, and may output a voltage/time signal, based on the input signal, to the scope block. As further shown, the voltage/time signal may correspond to the calculations performed by state blocks A, B, C, and/or D and/or the calculation of the function foo.

As indicated above, FIGS. 5A-5E are provided merely as an example. Other examples are possible and may differ from what was described with regard to FIGS. 5A-5E.

Figure 6:
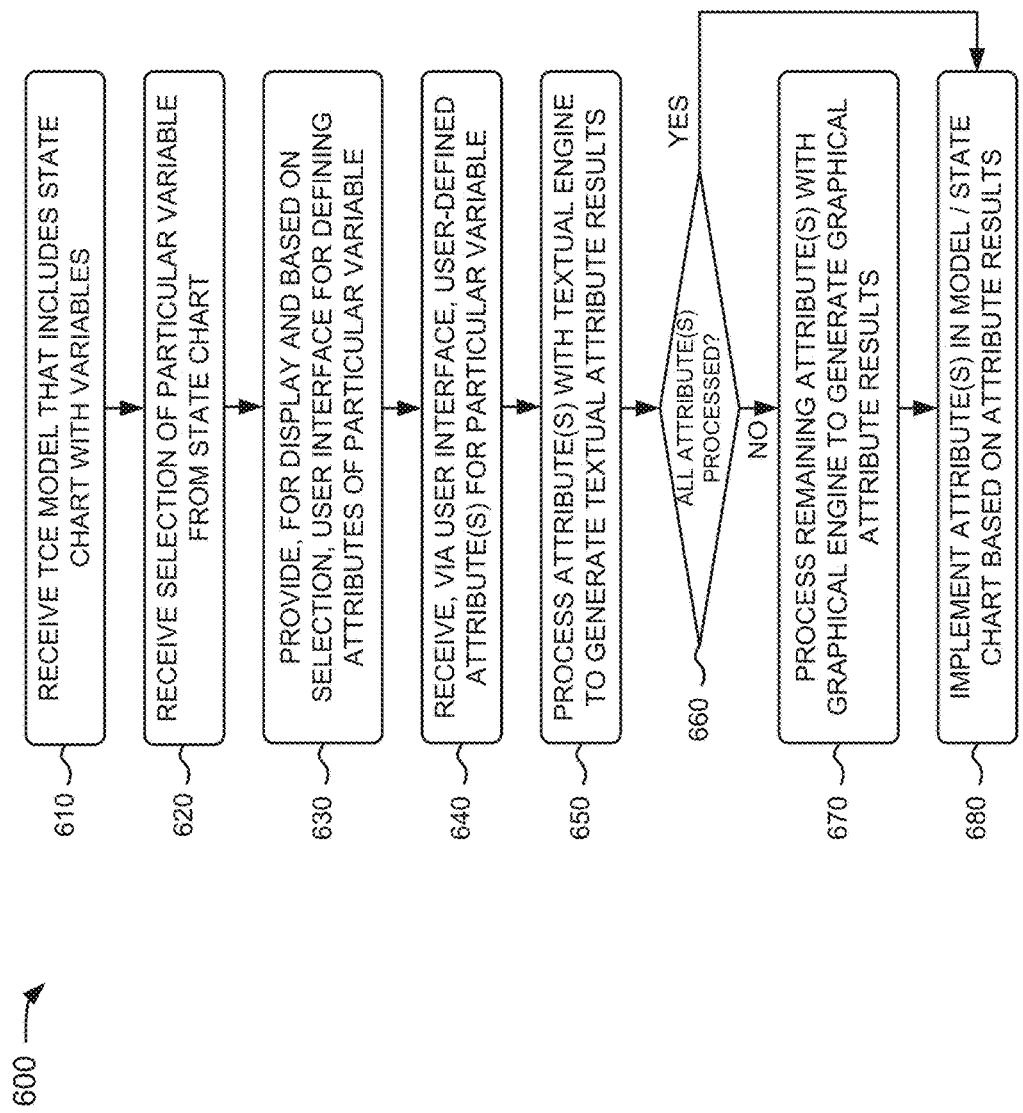
FIG. 6 is a flow chart of an example process for defining attributes of variables in a technical computing environment state chart.

FIG. 6 is a flow chart of an example process 600 for defining attributes of variables in a technical computing environment state chart. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include receiving a TCE model that includes a state chart with variables (block 610). For example, TCE 220 may cause client device 210 to display a user interface to a user of client device 210. The user interface may include mechanisms (e.g., menus, buttons, icons, libraries, etc.) that enable the user to create a model for TCE 220. In some implementations, the user may wish to create a model that includes a state chart with one or more chart elements (e.g., state blocks), one or more input signals, and one or more output signals. Each of the chart elements may be associated with a physical device, a subsystem, another model, etc. of a system being modeled. In some implementations, the state chart may include one or more variables provided by the textual environment and associated with the one or more chart elements.

In some implementations, the user of client device 210 may utilize TCE 220 to import the model into TCE 220 from memory (e.g., memory 330 or storage component 340) of client device 210. In some implementations, the user of client device 210 may utilize TCE 220 to import the model into TCE 220 from another source, such as, for example, server device 230 or an external memory device (e.g., a CD-ROM, a flash memory, etc.).

As further shown in FIG. 6, process 600 may include receiving a selection of a particular variable from the state chart (block 620). For example, the user may select, with a selection mechanism (e.g., a mouse), a particular variable from the state chart. In some implementations, the user may select the particular variable by hovering over (e.g., with the mouse) the particular variable in the state chart. For example, assume that the state chart includes a state block B that utilizes variables a, b, and c, and that the user wants to select variable a. In such an example, the user may select variable a, with the mouse, by pointing to and selecting variable a or by hovering over variable a.

As further shown in FIG. 6, process 600 may include providing, for display and based on the selection, a user interface for defining attributes of the particular variable (block 630). For example, when the user selects the particular variable from the state chart, TCE 220 may cause client device 210 to display a window, or another display mechanism, for defining attributes associated with the particular variable. In some implementations, the window may display attributes, such as, for example, a name of the particular variable; a scope (e.g., input variable or output variable) of the particular variable; scoping of variables to states; a size of the particular variable; a complexity of the particular variable; a type of the particular variable; a limit range (e.g., a minimum value and/or a maximum value) of the particular variable; sample time; etc. In some implementations, the window may enable the user to input the attributes for the particular variable in input boxes or to select the attributes from menus associated with the attributes.

In some implementations, the user may define all of the attributes for the particular variable or a subset of the attributes for the particular variable. For example, the user may set the size and the complexity of the particular variable to "inherited," but may specify the type of the input variable (e.g., as a single). Setting the size and the complexity of the particular variable to inherited may cause the size and the complexity of the variable to be inferred by TCE 220.

In some implementations, the window may enable the user to input code that defines attributes for the particular variable. For example, assume that the particular variable is X and that the user wishes to define variable X as a double type. In such an example, the user may input code (e.g., X=10) that defines the type for variable X as a double. Now assume that the user wishes to change the type for variable X to uint8. The user may input code (e.g., uint X or X=3.2) that changes the type for variable X from a double to a uint8. In some implementations, the user may input other code that defines other attributes of variable X.

As further shown in FIG. 6, process 600 may include receiving, via the user interface, one or more user-defined attributes for the particular variable (block 640). For example, after the user has defined the attributes for the particular variable, the user may select a display mechanism (e.g., an "Apply" button) that causes the defined attributes to be provided to TCE 220. In some implementations, the defined attributes may be provided to TCE 220 when the user enters the code defining the attributes for the particular variable. TCE 220 may receive the defined attributes for the particular variable, and may apply the attributes to the state chart and/or the model.

As further shown in FIG. 6, process 600 may include processing the attribute(s) with a textual engine to generate textual attribute results (block 650). For example, TCE 220 may process the attributes for the particular variable to generate textual attribute results. In some implementations, TCE 220 may provide the attributes to textual engine 228, and textual engine 228 may process the attributes that are understood by textual engine 228. For example, assume that the user defines a scope attribute (e.g., output) and a type attribute (e.g., a single) for a variable Y. In such an example, textual engine 228 may understand the scope attribute and may process the scope attribute. For example, textual engine 228 may define variable Y as an output variable in the model and/or the state chart. The defining of variable Y as an output variable may be referred as textual attribute results. However, textual engine 228 may not understand the type attribute since textual engine 228 may define variable types based on references to the variable in script or a function associated with the model and/or the state chart. In some implementations, textual engine 228 may provide attributes, not understood by textual engine 228, to graphical engine 226 for processing.

As further shown in FIG. 6, process 600 may include determining whether all of the attribute(s) have been processed (block 660). For example, TCE 220 may determine whether textual engine 228 processed all of the attributes for the particular variable. In some implementations, TCE 220 may determine that textual engine 228 processed all of the attributes when textual engine 228 does not provide any attributes to graphical engine 226 for processing. In some implementations, TCE 220 may determine that textual engine 228 did not process all of the attributes when textual engine 228 provides one or more attributes to graphical engine 226 for processing.

As further shown in FIG. 6, if all of the attribute(s) have not been processed (block 660—NO), process 600 may include processing remaining attribute(s) with a graphical engine to generate graphical attribute results (block 670). For example, if TCE 220 determines that textual engine 228 does not process all of the attributes, textual engine 228 may provide the unprocessed attributes to graphical engine 226. In some implementations, graphical engine 226 may process the unprocessed attributes for the particular variable to generate graphical attribute results. For example, assume that the user defines a scope attribute (e.g., input) and a type attribute (e.g., a double) for a variable Z. In such an example, textual engine 228 may understand the scope attribute and may process the scope attribute. However, textual engine 228 may not understand the type attribute, and may provide the type attribute to graphical engine 226 for processing. For example, graphical engine 226 may define variable Z as a double type in the model and/or the state chart. The defining of variable Z as a double type may be referred to as graphical attribute results.

As further shown in FIG. 6, if all of the attribute(s) have been processed (block 660—YES) or if the remaining attribute(s) are processed by the graphical engine (block 670), process 600 may include implementing the attribute(s) in the model and/or the state chart based on the attribute results (block 680). For example, if TCE 220 determines that textual engine 228 does not process all of the attributes or if graphical engine 226 processes the remaining attributes, TCE 220 may implement the attributes of the particular value in the state chart and/or the model based on the attribute results. In some implementations, TCE 220 may implement the textual attribute results and the graphical attribute results in the model and/or the state chart so that the attributes for the particular variable are defined in the model and/or the state chart.

In some implementations, the user may repeat process 600 for the particular variable (e.g., to redefine one or more attributes) or for any other variable of the model and/or the state chart. Once the variable attributes are defined, the user may utilize the model and/or the state chart. For example, the user may execute the model and/or the state chart to generate results, may store the model and/or the state chart in memory, may compile the model and/or the state chart into code that may be embedded in a physical device, etc.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7B:
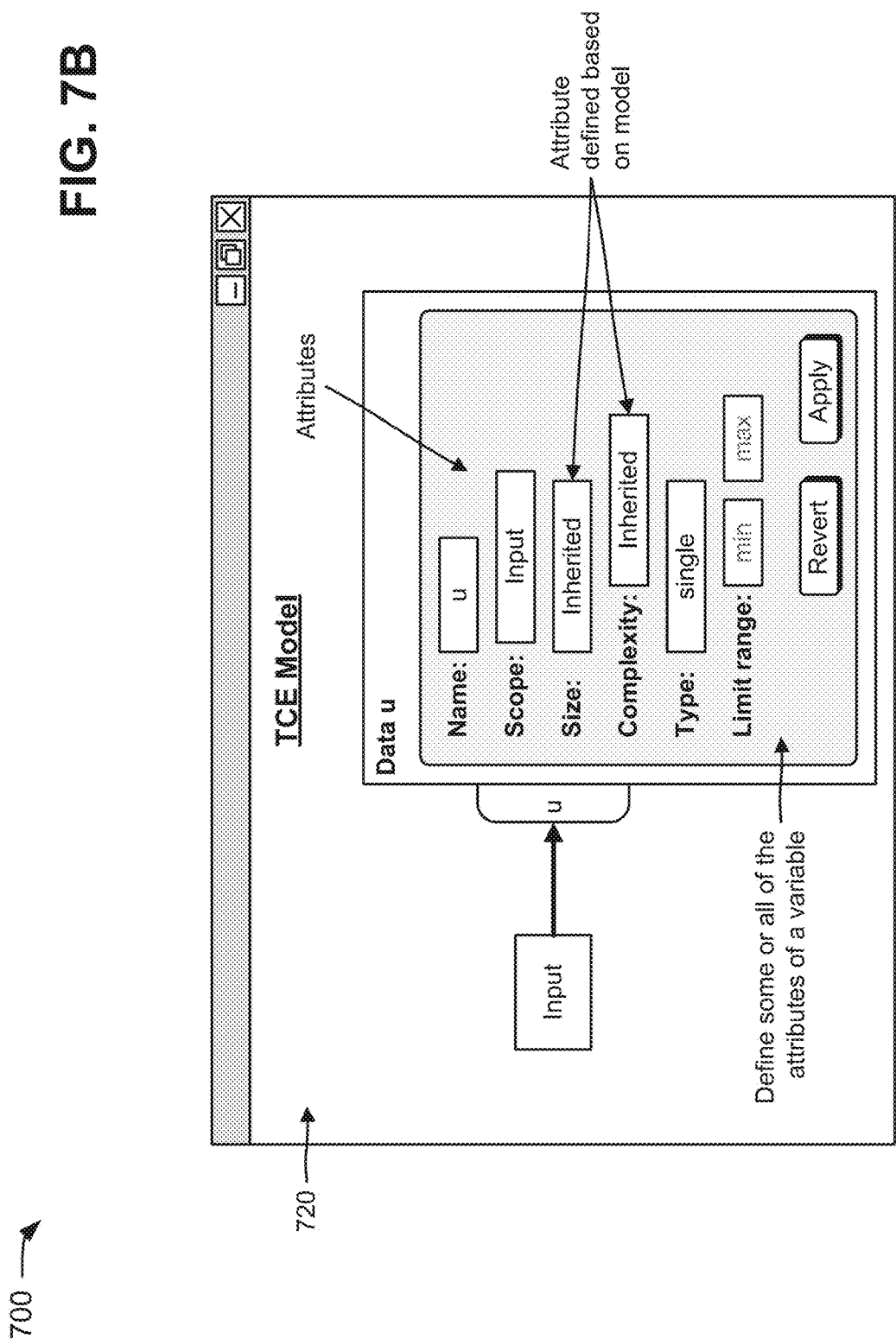

FIGS. 7A-7E are diagrams of an example 700 relating to example process 600 shown in FIG. 6. In example 700, assume that a user of client device 210 utilizes TCE 220 to create a model or to import the model into TCE 220. As shown in FIG. 7A, TCE 220 may cause client device 210 to display the model in a user interface 710 as the user creates the model or after the user imports the model. The model may include an input block, a chart block, and an output block.

The input block may be associated with a system that provides an input signal (e.g., variable u provided by the textual environment) to the chart block. The chart block may include a representation of a chart that calculates a square root of the input signal to generate an output signal (e.g., variable y provided by the textual environment). The chart block may provide the output signal to the output block. The output block may be associated with a system that receives the output signal and utilizes the output signal (e.g., displays the square root of variable u as variable y).

The chart block may include a state chart with a single state block (e.g., state block A). State block A may receive the input signal, and may calculate the square root of the input signal based on textual code (e.g., y=sqrt(u)) generated in the textual environment. State block A may provide the calculated square root to the output block. As further shown in FIG. 7A, the user may utilize a selection mechanism (e.g., a mouse) to select any of the blocks of the model, the variables of the model, etc. In example 700, assume that the user selects the input variable (e.g., variable u) so that the user may define attributes associated with the input variable.

When the user selects the input variable, TCE 220 may cause client device 210 to display a window for defining attributes of the input variable, as shown in a user interface 720 of FIG. 7B. The attributes may include, for example, a name, a scope, a size, a complexity, a type, sample time, and a limit range of the input variable. In example 700, assume that the user sets the name of the input variable to u, sets the scope of the input variable to input, sets the size and the complexity of the input variable to inherited, sets the type of the input variable to single, and does not set a limit range on the input variable. Since the user set the size and the complexity of the input variable to inherited, the size and the complexity of the input variable may be defined based on a reference to the input variable in a script or a function of the model.

As further shown in FIG. 7B, the user may define all of the attributes for the input variable or a subset of the attributes for the input variable. In example 700, the user sets the size and the complexity of the input variable to inherited (e.g., undefined) and does not define the limit range for the input variable. However, the user specifies the scope of the input variable (e.g., input) and the type of the input variable (e.g., as a single). The defined attributes (e.g., the scope and the type of the input variable) may provide hints that enable TCE 220 to infer undefined attributes (e.g., the size and the complexity of the input variable). For example, if an input variable is defined as a single, TCE 220 may infer that the input variable is not a complex number since single precision data type may not be associated with complex numbers. In example 700, assume that the user applies the defined attributes in the model and the state chart by selecting an "Apply" button, as further shown in FIG. 7B. When the user selects the "Apply" button, TCE 220 may implement the defined attributes in the model and the state chart, and may attempt to infer undefined attributes from the defined attributes.

Figure 7C:
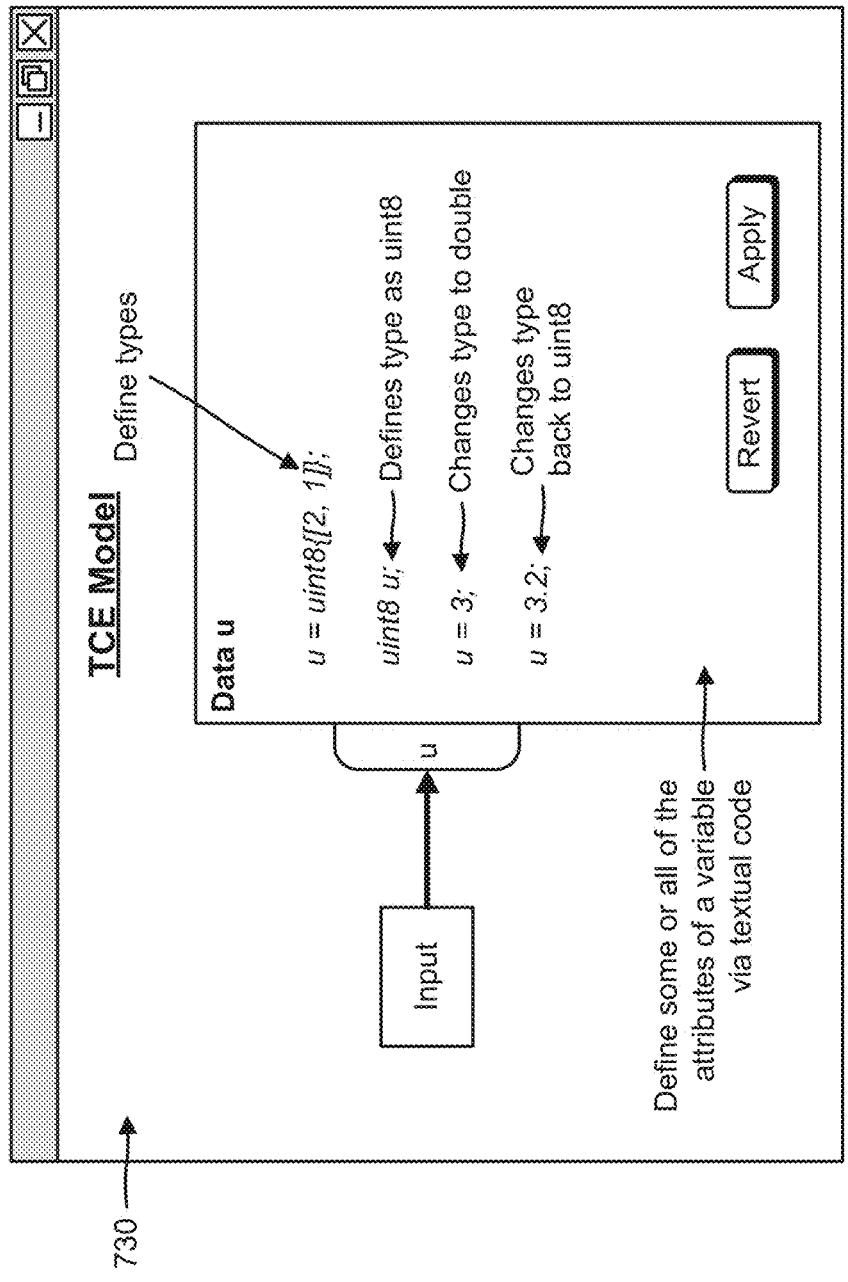

In example 700, the user may define the attributes for the input variable by inputting code that defines attributes for the input variable, as shown in a user interface 730 of FIG. 7C. The window of user interface 730 may be displayed in conjunction with or separately from the window of user interface 720 of FIG. 7B, when the user selects the input variable. As shown in FIG. 7C, the user may utilize the window to define types for the input variable, but may define other attributes via the window. In example 700, assume that the user initially defines the input variable as a uint8 type with the code u=uint8{[2, 1]}. The user may also define the input variable as a uint8 type with the code uint8 u. If the user wishes to change the type defined for the input variable to a double, the user may input the code u=3. If the user wishes to change the type defined for the input variable back to a uint8 type, the user may input the code u=3.2 unit8[1, 20]. In example 700, assume that the user applies the defined types in the model and the state chart by selecting an "Apply" button, as further shown in FIG. 7C. The user may also input such information directly into the state chart. For example, in FIG. 5B, the size, type, complexity of "chart out" may be inferred from the definition chart_out=a.data. If the statement was chart_out=uint8(a_data) then TCE 220 may infer the size and complexity of chart_out from a_data.

Figure 7D:
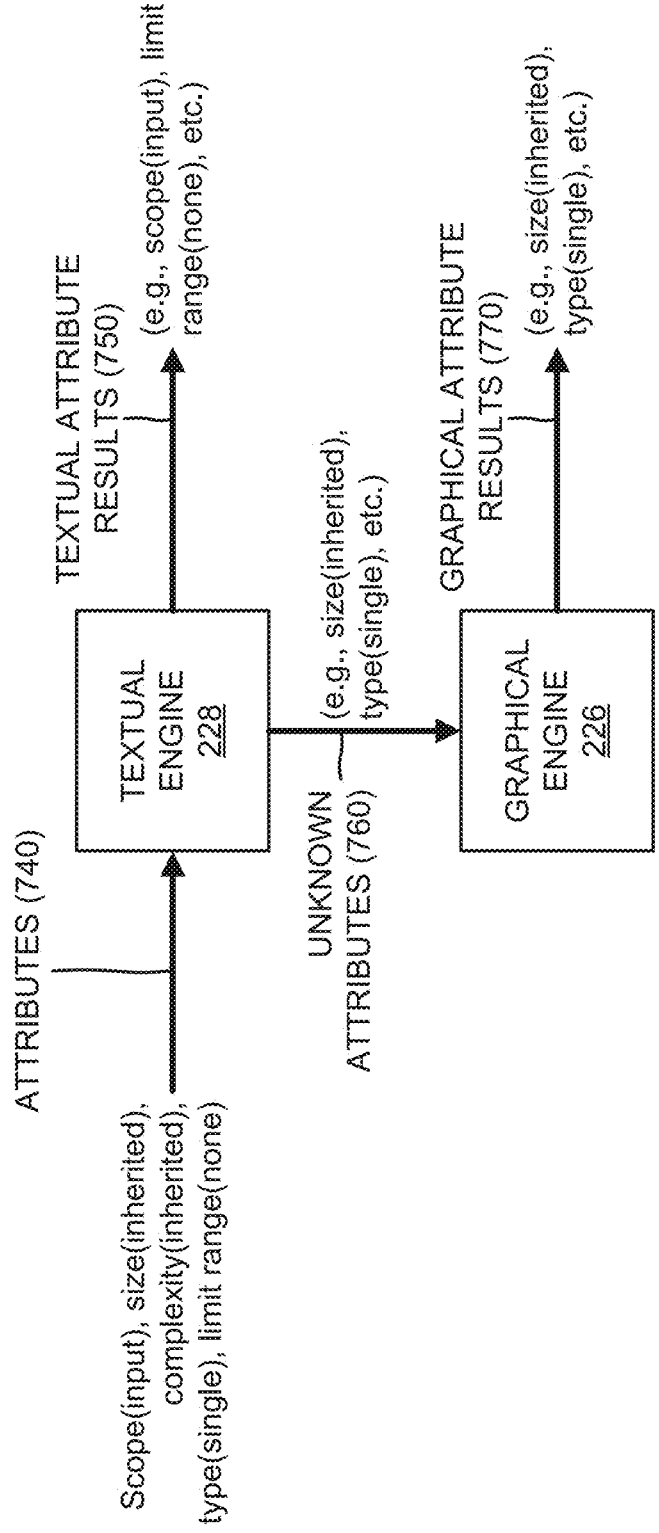

When the user elects to apply the defined attributes in the model and the state chart, TCE 220 may provide the defined attributes to textual engine 228, as indicated by reference number 740 in FIG. 7D. Attributes 740 may include the scope (e.g., input), the size (e.g., inherited), the complexity (e.g., inherited), the type (e.g., single), sample time, and the limit range (e.g., none) associated with the input variable. Textual engine 228 may process attributes 740, which are understood by textual engine 228, to generate textual attribute results 750. In example 700, assume that textual engine 228 understands and processes the scope and the limit range of the input variable. Textual engine 228 may apply the scope and the limit range to the model to generate textual attribute results 750 (e.g., the scope set to input and the limit range not specified). For example, textual attribute results 750 may include setting the scope of the input variable to "input" in the model, and not providing a limit range on the input variable in the model.

As further shown in FIG. 7D, textual engine 228 may provide attributes 760, unknown to textual engine 228, to graphical engine 226. In example 700, assume that the size, the complexity, and the type are not understood by textual engine 228, and that textual engine 228 provides these attributes to graphical engine 226 as unknown attributes 760. Graphical engine 226 may process unknown attributes 760 to generate graphical attribute results 770. In example 700, assume that graphical engine 226 understands and processes the size, the complexity, and the type of the input variable. Graphical engine 226 may apply the size, the complexity, and the type to the model to generate graphical attribute results 770. For example, graphical attribute results 770 may include setting the size of the input variable to undefined (e.g., inherited) in the model, setting the complexity of the input variable to undefined (e.g., inherited) in the model, and setting the type of the input variable to a single precision data type in the model.

Figure 7E:
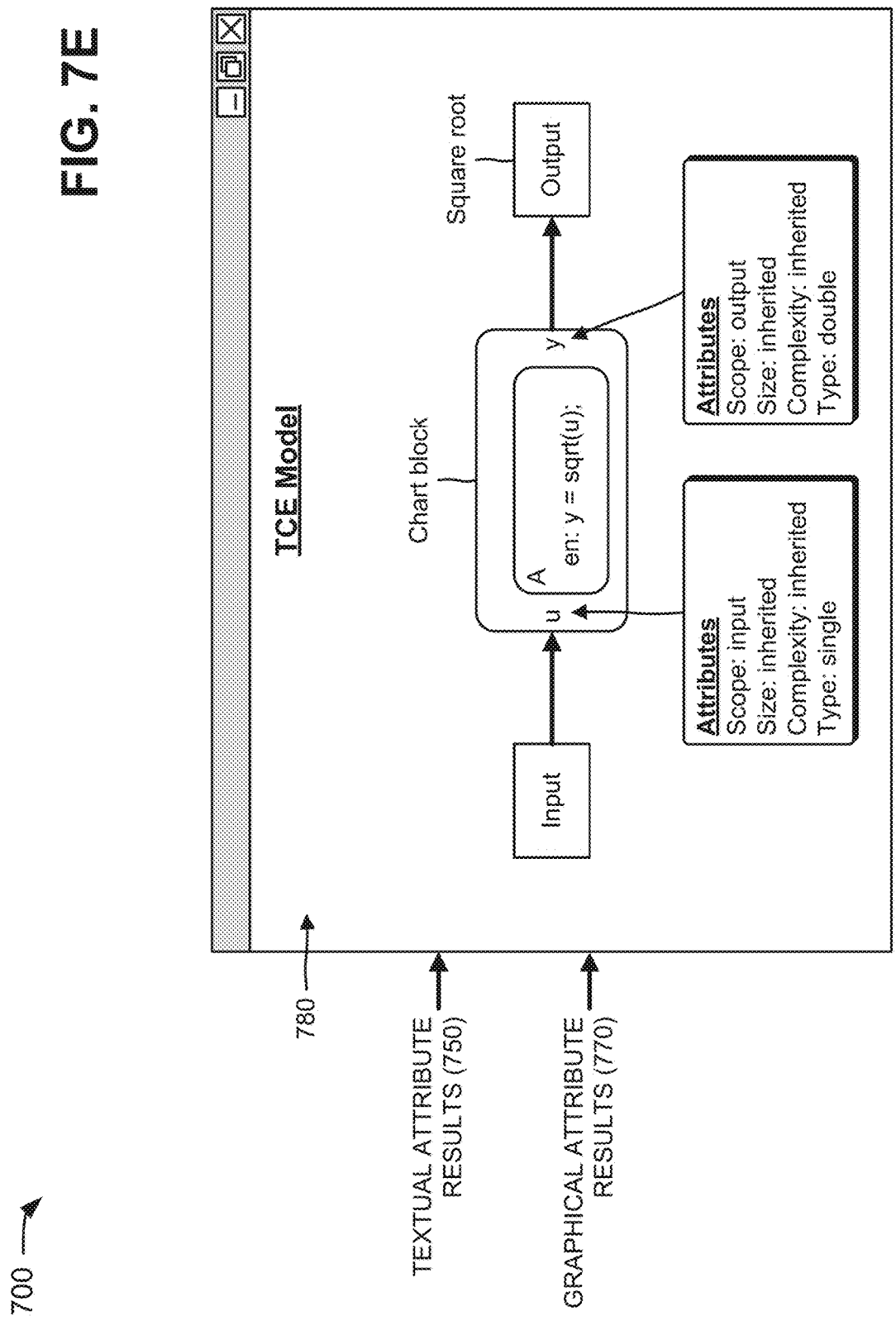

When textual attribute results 750 and graphical attribute results 770 are implemented in the model and the state chart, the attributes for the input variable may be defined in the model and the state chart, as shown in FIG. 7E. The user may repeat this process for the input variable (e.g., to redefine one or more attributes) or for the output variable (e.g., variable y) of the model and the state chart. Once the variable attributes are defined, the user may utilize the model to calculate the square root of the input variable. In example 700, the user may execute the model to generate the square root, may store the model, the state chart, and/or the square root in memory, may compile the model and/or the state chart into code that may be embedded in a physical device, etc.

As further shown in a user interface 780 of FIG. 7E, the user may quickly see what attributes are defined for the variables by selecting or hovering over the variables. In example 700, when the user selects or hovers over variable u, TCE 220 may cause client device 210 to display a window or some other display mechanism that lists the attributes for the variable u. As shown in FIG. 7E, the scope (e.g., input), the size (e.g., inherited), the complexity (e.g., inherited), and the type (e.g., single) may be displayed for variable u. In example 700, when the user selects or hovers over variable y, TCE 220 may cause client device 210 to display a window or some other display mechanism that lists the attributes for the variable y. As shown in FIG. 7E, the scope (e.g., output), the size (e.g., inherited), the complexity (e.g., inherited), and the type (e.g., double) may be displayed for variable y. The windows may also be used to modify the attributes for variables u and y.

As indicated above, FIGS. 7A-7E are provided merely as an example. Other examples are possible and may differ from what was described with regard to FIGS. 7A-7E.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a technical computing environment (TCE) (e.g., via a touch screen display, a mouse, a keyboard, a keypad, voice commands, etc.).

The term code is to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include code generated using a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
    receiving a model generated via a technical computing environment,
        the model including a state chart with one or more variables,
        the model being associated with a graphical environment of the technical computing environment,
        the state chart being associated with a textual environment of the technical computing environment, and
        the receiving the model being performed by a device;
    receiving a selection of a particular variable from the state chart,
        the receiving the selection being performed by the device;
    parsing the state chart into a textual portion and a graphical portion,
        the parsing being performed by the device;
    providing, for display and based on the selection, a user interface for defining attributes associated with the particular variable,
        the providing the user interface being performed by the device;
    receiving, via the user interface, a user input indicating a value for a selected attribute, of the attributes, to generate a user-defined attribute for the selected attribute associated with the particular variable,
        the receiving the user input being performed by the device,
        the user-defined attribute including at least one of:
            a scope attribute,
            a sample time attribute,
            a range attribute,
            a size attribute,
            a complexity attribute, or
            a type attribute;
    analyzing the user-defined attribute and textual code associated with the particular variable to determine information for inferring at least one undefined attribute for the particular variable and to generate at least one inferred attribute for the particular variable,
        the at least one undefined attribute being different than the user-defined attribute,
        the analyzing the user-defined attribute being performed by the device;
    processing the attributes associated with the particular variable, with a textual engine of the technical computing environment, to generate textual attribute results,
        the processing the attributes being performed by the device;
    determining that the user-defined attribute is not understood and processed by the textual engine, the determining that the user-defined attribute is not understood by the textual engine being performed by the device;
transforming at least a part of the graphical portion into a transformed graphical portion,
the transforming including:
identifying first information in the graphical portion that is not understood by a graphical engine of the technical computing environment,
providing the first information to a transformer, and transforming the first information into the transformed graphical portion, and
the transforming being performed by the device;
providing the transformed graphical portion to the graphical engine,
the providing being performed by the device;
processing the transformed graphical portion with the graphical engine to generate a graphical attribute result,
the processing the transformed graphical portion being performed by the device; and
applying the user-defined attribute in the model and the state chart based on the textual attribute results and the graphical attribute result,
the applying being performed by the device.

2. The method of claim 1, further comprising:
applying the at least one inferred attribute in the model and the state chart.

3. The method of claim 1, where the at least one inferred attribute includes at least one of:
an inferred scope attribute,
an inferred sample time attribute,
an inferred range attribute,
an inferred size attribute,
an inferred complexity attribute, or
an inferred type attribute.

4. The method of claim 1, where the user-defined attribute is a portion of the attributes associated with the particular variable.

5. The method of claim 1, further comprising:
receiving another selection of the particular variable from the state chart; and
providing, for display and based on the other selection, the user-defined attribute.

6. The method of claim 1, where the user-defined attribute is provided, via code input, to the user interface.

7. The method of claim 1, where the user-defined attribute is provided, via menus, input boxes, or the model, to the user interface.

8. A device, comprising:
one or more processors to:
receive a model generated via a technical computing environment,
the model including a state chart with one or more variables,
the model being associated with a graphical environment of the technical computing environment, and
the state chart being associated with a textual environment of the technical computing environment,
receive a selection of a particular variable, of the one or more variables, from the state chart,
parse the state chart into a textual portion and a graphical portion,
provide, for display and based on the selection, a user interface for defining attributes associated with the particular variable,
receive, via the user interface, a user input indicating a value for a selected attribute, of the attributes, to generate a user-defined attribute for the selected attribute associated with the particular variable, each of the user input including at least one of:
a scope attribute,
a sample time attribute,
a range attribute,
a size attribute,
a complexity attribute, or
a type attribute,
analyze the user-defined attribute and textual code associated with the particular variable to determine information for inferring at least one undefined attribute for the particular variable and to generate at least one inferred attribute for the particular variable,
the at least one undefined attribute being different than the user-defined attribute,
process the attributes associated with the particular variable, with a textual engine of the technical computing environment, to generate textual attribute results,
determine that the user-defined attribute is not understood and processed by the textual engine,
transform at least a part of the graphical portion of the model into a transformed graphical portion,
the one or more processors, when transforming the graphical portion of the model, are to:
identify first information in the graphical portion that is not understood by a graphical engine of the technical computing environment,
provide the first information to a transformer, and transform the first information into the transformed graphical portion,
provide the transformed graphical portion to the graphical engine,
process the transformed graphical portion with the graphical engine to generate a graphical attribute result, and
apply the user-defined attribute in the model and the state chart based on the textual attribute results and the graphical attribute result.

9. The device of claim 8, where the one or more processors are further to:
apply the at least one inferred attribute in the model and the state chart.

10. The device of claim 8, where the at least one inferred attribute includes at least one of:
an inferred scope attribute,
an inferred sample time attribute,
an inferred range attribute,
an inferred size attribute,
an inferred complexity attribute, or
an inferred type attribute.

11. The device of claim 8, where the user-defined attribute is a portion of the attributes associated with the particular variable.

12. The device of claim 8, where the one or more processors are further to:
receive another selection of the particular variable from the state chart, and
provide, for display and based on the other selection, the user-defined attribute.

13. The device of claim 8, where the user-defined attribute is provided, via code input, menus, or input boxes, to the user interface.

14. The device of claim 8, where the user-defined attribute is provided, via code input, to the user interface.

15. A non-transitory computer-readable medium storing instructions, the instructions comprising:
one or more instructions that, when executed by one or more processors of a device, cause the one or more processors to:
receive a model generated via a technical computing environment,
the model including a state chart with one or more variables,
the model being associated with a graphical environment of the technical computing environment, and
the state chart being associated with a textual environment of the technical computing environment,
receive a selection of a particular variable, of the one or more variables, from the state chart,
parse the state chart into a textual portion and a graphical portion,
provide, for display and based on the selection, a user interface for defining attributes associated with the particular variable,
receive, via the user interface, a user input indicating a value for a selected attribute, of the attributes, to generate a user-defined attribute for the selected attribute associated with the particular variable,
the user-defined attribute including at least one of:
a scope attribute,
a sample time attribute,
a range attribute,
a size attribute,
a complexity attribute, or
a type attribute,
analyze the user-defined attribute and textual code associated with the particular variable to determine information for inferring at least one undefined attribute for the particular variable and to generate at least one inferred attribute for the particular variable,
the at least one undefined attribute being different than the user-defined attribute,
process the attributes associated with the particular variable, with a textual engine of the technical computing environment, to generate textual attribute results,
determine that the user-defined attribute is not understood and processed by the textual engine,
transform at least a part of the graphical portion of the model into a transformed graphical portion,
the one or more instructions that, when executed by one or more processors to transform the graphical portion of the model, cause the one or more processors to:
identify first information in the graphical portion that is not understood by a graphical engine of the technical computing environment,
provide the first information to a transformer, and transform the first information into the transformed graphical portion,
provide the transformed graphical portion to the graphical engine,
process, with the graphical engine, the transformed graphical portion to generate a graphical attribute result, and
apply the user-defined attribute in the model and the state chart based on the textual attribute results and the graphical attribute result.

16. The non-transitory computer-readable medium of claim 15, where the instructions further comprise:
one or more instructions that, when executed by the one or more processors, cause the one or more processors to:
execute, based on the user-defined attribute, the model and the state chart to generate results, and
output or store the results.

17. The non-transitory computer-readable medium of claim 15, where the at least one inferred attribute includes at least one of:
an inferred scope attribute that defines the particular variable as an input variable or an output variable,
an inferred sample time attribute,
an inferred range attribute,
an inferred size attribute,
an inferred complexity attribute, or
an inferred type attribute.

18. The non-transitory computer-readable medium of claim 15, where the user-defined attribute is a portion of the attributes associated with the particular variable.

19. The non-transitory computer-readable medium of claim 15, where the instructions further comprise:
one or more instructions that, when executed by the one or more processors, cause the one or more processors to:
receive another selection of the particular variable from the state chart, and
provide, for display and based on the other selection, the user-defined attribute.

20. The non-transitory computer-readable medium of claim 15, where the user-defined attribute is provided to the user interface:
via code input,
via a menu, or
via an input box.

* * * * *